US011210375B2

(12) United States Patent
Streit

(10) Patent No.: US 11,210,375 B2
(45) Date of Patent: Dec. 28, 2021

(54) SYSTEMS AND METHODS FOR BIOMETRIC PROCESSING WITH LIVENESS

(71) Applicant: Private Identity LLC, Potomac, MD (US)

(72) Inventor: Scott Edward Streit, Woodbine, MD (US)

(73) Assignee: Private Identity LLC, Potomac, MD (US)

( * ) Notice: Subject to any disclaimer, the term of this patent is extended or adjusted under 35 U.S.C. 154(b) by 0 days.

(21) Appl. No.: 16/218,139

(22) Filed: Dec. 12, 2018

(65) Prior Publication Data

US 2019/0278895 A1 Sep. 12, 2019

Related U.S. Application Data

(63) Continuation-in-part of application No. 15/914,562, filed on Mar. 7, 2018, and a continuation-in-part of
(Continued)

(51) Int. Cl.
*G06K 9/00* (2006.01)
*G06F 21/32* (2013.01)
*G06N 3/08* (2006.01)

(52) U.S. Cl.
CPC ......... *G06F 21/32* (2013.01); *G06K 9/00906* (2013.01); *G06N 3/08* (2013.01)

(58) Field of Classification Search
USPC .......................................... 382/115, 156, 190
See application file for complete search history.

(56) References Cited

U.S. PATENT DOCUMENTS 5,408,588 A * 4/1995 Ulug ................... G06K 9/4604
706/25
5,805,731 A 9/1998 Yaeger et al.
(Continued)

FOREIGN PATENT DOCUMENTS

EP  2784710 B1  6/2018

OTHER PUBLICATIONS

Al-Waisy etal, "A Multimodal Biometric System for Personal Identification Based on Deep Learning Approaches", 2017 Seventh International Conference on Emerging Security Technologies, 2017 IEEE, pp. 162-168 (Year: 2017).*
(Continued)

*Primary Examiner* — Kathleen Y Dulaney
(74) *Attorney, Agent, or Firm* — Wolf, Greenfield & Sacks, P.C.

(57) ABSTRACT

In one embodiment, a set of feature vectors can be derived from any biometric data, and then using a deep neural network ("DNN") on those one-way homomorphic encryptions (i.e., each biometrics' feature vector) an authentication system can determine matches or execute searches on encrypted data. Each biometrics' feature vector can then be stored and/or used in conjunction with respective classifications, for use in subsequent comparisons without fear of compromising the original biometric data. In various embodiments, the original biometric data is discarded responsive to generating the encrypted values. In another embodiment, the homomorphic encryption enables computations and comparisons on cypher text without decryption of the encrypted feature vectors. Security of such privacy enable biometrics can be increased by implementing an assurance factor (e.g., liveness) to establish a submitted biometric has not been spoofed or faked.

19 Claims, 18 Drawing Sheets

Related U.S. Application Data application No. 15/914,942, filed on Mar. 7, 2018, and a continuation-in-part of application No. 15/914,969, filed on Mar. 7, 2018.

(56) References Cited

U.S. PATENT DOCUMENTS

| | | | |
|---|---|---|---|
| 5,838,812 | A | 11/1998 | Pare, Jr. et al. |
| 6,480,621 | B1 | 11/2002 | Lyon |
| 6,944,319 | B1* | 9/2005 | Huang ............... G06K 9/00288 |
| | | | 382/118 |
| 7,278,025 | B2 | 10/2007 | Saito et al. |
| 8,281,148 | B2* | 10/2012 | Tuyls .................. H04L 9/3231 |
| | | | 713/185 |
| 8,856,541 | B1 | 10/2014 | Chaudhury et al. |
| 8,966,277 | B2* | 2/2015 | Rane .................... H04L 9/3231 |
| | | | 713/186 |
| 9,003,196 | B2* | 4/2015 | Hoyos .................... G06F 21/34 |
| | | | 713/186 |
| 9,208,492 | B2 | 12/2015 | Hoyos |
| 9,313,200 | B2 | 4/2016 | Hoyos |
| 9,390,327 | B2 | 7/2016 | Gottemukkula et al. |
| 9,426,150 | B2 | 8/2016 | Stern et al. |
| 9,471,919 | B2 | 10/2016 | Hoyos et al. |
| 9,619,723 | B1 | 4/2017 | Chow et al. |
| 9,783,162 | B2* | 10/2017 | Hoyos .................... B60R 25/25 |
| 9,838,388 | B2 | 12/2017 | Mather et al. |
| 10,075,289 | B2* | 9/2018 | Laine ..................... H04L 9/008 |
| 10,108,902 | B1 | 10/2018 | Lockett |
| 10,180,339 | B1 | 1/2019 | Long et al. |
| 10,419,221 | B1 | 9/2019 | Streit |
| 10,467,526 | B1 | 11/2019 | Appalaraju et al. |
| 10,491,373 | B2* | 11/2019 | Jain ..................... H04L 63/0428 |
| 10,499,069 | B2 | 12/2019 | Wang et al. |
| 10,721,070 | B2 | 7/2020 | Streit |
| 10,938,852 | B1 | 3/2021 | Streit |
| 2002/0049685 | A1* | 4/2002 | Yaginuma ................ G06N 3/02 |
| | | | 706/21 |
| 2002/0104027 | A1 | 8/2002 | Skerpac |
| 2005/0138110 | A1 | 6/2005 | Redlich et al. |
| 2005/0149442 | A1 | 7/2005 | Adams et al. |
| 2006/0228005 | A1* | 10/2006 | Matsugu ............. G06K 9/00362 |
| | | | 382/116 |
| 2007/0155366 | A1 | 7/2007 | Manohar et al. |
| 2007/0177773 | A1 | 8/2007 | Hu et al. |
| 2007/0220595 | A1 | 9/2007 | M'raihi et al. |
| 2007/0245152 | A1 | 10/2007 | Pizano et al. |
| 2008/0113785 | A1 | 5/2008 | Alderucci et al. |
| 2008/0113786 | A1 | 5/2008 | Alderucci et al. |
| 2008/0247611 | A1* | 10/2008 | Aisaka ................. G06K 9/6255 |
| | | | 382/118 |
| 2009/0034803 | A1* | 2/2009 | Matos ..................... G06K 9/00 |
| | | | 382/116 |
| 2010/0131273 | A1* | 5/2010 | Aley-Raz ................ G10L 17/04 |
| | | | 704/247 |
| 2010/0162386 | A1 | 6/2010 | Li et al. |
| 2010/0180127 | A1 | 7/2010 | Li et al. |
| 2011/0026781 | A1* | 2/2011 | Osadchy ............ G06K 9/00221 |
| | | | 382/118 |
| 2012/0195475 | A1* | 8/2012 | Abiko ................ G06K 9/00093 |
| | | | 382/115 |
| 2013/0080166 | A1* | 3/2013 | Buffum .............. G06Q 20/4014 |
| | | | 704/236 |
| 2013/0148868 | A1* | 6/2013 | Troncoso Pastoriza ................ |
| | | | G06K 9/00885 |
| | | | 382/118 |
| 2013/0166296 | A1 | 6/2013 | Scheffer |
| 2013/0212049 | A1* | 8/2013 | Maldonado .............. G06N 3/08 |
| | | | 706/12 |
| 2013/0307670 | A1 | 11/2013 | Ramaci |
| 2013/0318351 | A1 | 11/2013 | Hirano et al. |
| 2014/0283061 | A1 | 9/2014 | Quinlan et al. |
| 2014/0304505 | A1 | 10/2014 | Dawson |
| 2014/0331059 | A1* | 11/2014 | Rane .................. G06K 9/00093 |
| | | | 713/186 |
| 2014/0337930 | A1 | 11/2014 | Hoyos et al. |
| 2015/0170053 | A1* | 6/2015 | Miao ..................... G06N 20/00 |
| | | | 706/12 |
| 2015/0310444 | A1 | 10/2015 | Chen et al. |
| 2015/0347820 | A1 | 12/2015 | Yin et al. |
| 2016/0078485 | A1 | 3/2016 | Shim et al. |
| 2016/0127359 | A1 | 5/2016 | Minter et al. |
| 2016/0140438 | A1* | 5/2016 | Yang ........................ G06N 3/08 |
| | | | 706/12 |
| 2016/0164682 | A1 | 6/2016 | Hartloff et al. |
| 2016/0350648 | A1* | 12/2016 | Gilad-Bachrach ... G06N 3/0481 |
| 2016/0371438 | A1 | 12/2016 | Annulis |
| 2016/0373440 | A1 | 12/2016 | Mather et al. |
| 2016/0379041 | A1* | 12/2016 | Rhee .................... G06K 9/6296 |
| | | | 382/118 |
| 2016/0379044 | A1* | 12/2016 | Tang .................. G06K 9/00288 |
| | | | 382/118 |
| 2017/0008168 | A1 | 1/2017 | Weng et al. |
| 2017/0046563 | A1 | 2/2017 | Kim et al. |
| 2017/0093851 | A1 | 3/2017 | Allen |
| 2017/0098140 | A1* | 4/2017 | Wang ........................ G06T 3/40 |
| 2017/0126672 | A1 | 5/2017 | Jang |
| 2017/0132526 | A1 | 5/2017 | Cohen et al. |
| 2017/0169331 | A1* | 6/2017 | Garner .................. G05B 13/00 |
| 2017/0289168 | A1 | 10/2017 | Bar et al. |
| 2017/0357890 | A1* | 12/2017 | Kim ........................ G06F 40/30 |
| 2018/0018451 | A1 | 1/2018 | Spizhevoy et al. |
| 2018/0025243 | A1* | 1/2018 | Chandraker ....... G06K 9/00228 |
| | | | 382/118 |
| 2018/0060552 | A1* | 3/2018 | Pellom .................... G06F 21/32 |
| 2018/0082172 | A1 | 3/2018 | Patel et al. |
| 2018/0137375 | A1 | 5/2018 | Han et al. |
| 2018/0139054 | A1* | 5/2018 | Chu ..................... H04L 9/3247 |
| 2018/0173861 | A1 | 6/2018 | Guidotti et al. |
| 2018/0173980 | A1* | 6/2018 | Fan ...................... G06K 9/2027 |
| 2018/0232508 | A1 | 8/2018 | Kursun |
| 2018/0276488 | A1* | 9/2018 | Yoo .................... G06K 9/00228 |
| 2018/0293429 | A1* | 10/2018 | Wechsler ........... G06K 9/00926 |
| 2018/0330179 | A1 | 11/2018 | Streit |
| 2018/0336472 | A1* | 11/2018 | Ravi ........................ G06N 3/04 |
| 2018/0373979 | A1 | 12/2018 | Wang et al. |
| 2019/0005126 | A1* | 1/2019 | Chen ..................... G06N 5/022 |
| 2019/0019061 | A1* | 1/2019 | Trenholm .............. G06N 20/00 |
| 2019/0020482 | A1 | 1/2019 | Gupta et al. |
| 2019/0042895 | A1* | 2/2019 | Liang ................. G06K 9/00288 |
| 2019/0044723 | A1 | 2/2019 | Prakash et al. |
| 2019/0068627 | A1 | 2/2019 | Thampy |
| 2019/0080475 | A1* | 3/2019 | Ma ............................ G06N 3/08 |
| 2019/0132344 | A1 | 5/2019 | Lem et al. |
| 2019/0147305 | A1* | 5/2019 | Lu ......................... G06F 16/583 |
| | | | 382/157 |
| 2019/0147434 | A1 | 5/2019 | Leung |
| 2019/0171908 | A1* | 6/2019 | Salavon ............... G06N 3/0481 |
| 2019/0180090 | A1 | 6/2019 | Jiang et al. |
| 2019/0197331 | A1* | 6/2019 | Kwak ................... G06F 16/00 |
| 2019/0205620 | A1* | 7/2019 | Yi ........................ G06K 9/0268 |
| 2019/0215551 | A1 | 7/2019 | Modarresi et al. |
| 2019/0236273 | A1* | 8/2019 | Saxe ..................... G06F 21/56 |
| 2019/0244138 | A1* | 8/2019 | Bhowmick ............. H04L 9/008 |
| 2019/0253431 | A1 | 8/2019 | Atanda |
| 2019/0278937 | A1 | 9/2019 | Streit |
| 2019/0279047 | A1 | 9/2019 | Streit |
| 2019/0280868 | A1 | 9/2019 | Streit |
| 2019/0280869 | A1 | 9/2019 | Streit |
| 2019/0286950 | A1 | 9/2019 | Kiapour et al. |
| 2019/0294973 | A1 | 9/2019 | Kannan et al. |
| 2019/0306731 | A1 | 10/2019 | Raghuramu et al. |
| 2019/0318261 | A1 | 10/2019 | Deng et al. |
| 2019/0347432 | A1 | 11/2019 | Boivie |
| 2019/0354806 | A1 | 11/2019 | Chhabra |
| 2019/0372754 | A1* | 12/2019 | Gou ....................... G06F 17/153 |
| 2019/0372947 | A1 | 12/2019 | Penar et al. |
| 2020/0004939 | A1 | 1/2020 | Streit |
| 2020/0007931 | A1 | 1/2020 | Ho et al. |
| 2020/0014541 | A1 | 1/2020 | Streit |
| 2020/0044852 | A1 | 2/2020 | Streit |
| 2020/0097653 | A1 | 3/2020 | Mehta et al. |
| 2020/0099508 | A1 | 3/2020 | Ghorbani |
| 2020/0228336 | A1 | 7/2020 | Streit |

(56) References Cited

U.S. PATENT DOCUMENTS

| | | |
|---|---|---|
| 2020/0228339 A1 | 7/2020 | Barham et al. |
| 2020/0351097 A1 | 11/2020 | Streit |
| 2020/0365143 A1 | 11/2020 | Ogawa et al. |
| 2021/0141896 A1 | 5/2021 | Streit |

OTHER PUBLICATIONS

Graepel et al "ML Confidential: Machine Learning on Encrypted Data", 2012, Springer0Veralg Berlin Heidelberg 2013, pp. 1-21 (Year: 2013).*

Xie et al "Crypto-Nets: Neural Networks over Encrypted data", 2014, ICLR pp. 1-9 (Year: 2014).*

Ma et al, "A Secure Face-Verification Scheme Based on Homomrphjic Encryption and Deep Neural Networks", 2017, IEEE, vol. 5, 2017, pp. 16532-16538 (Year: 2017).*

Invitation to Pay Additional Fees dated Jun. 24, 2019 in connection with International Application No. PCT/US2019/021100.

Chen et al., Learning Multi-channel Deep Feature Representations for Face Recognition. JMLT: Workshop and Conference Proceedings. 2015:44;60-71.

Streit et al., Privacy Enabled Biometric Search. ArXiv e-prints. Aug. 16, 2017. 7 pages.

U.S. Appl. No. 15/914,436, filed Mar. 7, 2018, Streit.
U.S. Appl. No. 15/914,562, filed Mar. 7, 2018, Streit.
U.S. Appl. No. 15/914,942, filed Mar. 7, 2018, Streit.
U.S. Appl. No. 15/914,969, filed Mar. 7, 2018, Streit.

PCT/US2019/021100, Jun. 24, 2019, Invitation to Pay Additional Fees.

International Search Report and Written Opinion dated Aug. 26, 2019 in connection with International Application No. PCT/US2019/021100.

International Search Report and Written Opinion dated Sep. 30, 2019 in connection with International Application No. PCT/US2019/039537.

Kurban et al., A Multi-Biometric Recognition System Based on Deep Features of Face and Gesture Energy Image. 2017 IEEE International Conference on Innovations in Intelligent. Systems and Applications. 2017; 4 pages. https://ieeexplore.ieee.org/stamp/stamp.jsp?tp=&arnumber=8001186.

Lu et al., Discriminative Deep Metric Learning for Face and Kinship Verification. IEEE Transactions on Image Processing. 2017; 26 (9): 4269-4282.

Stuhlsatz et al., Feature Extraction with Deep Neural Networks by a Generalized Discriminant Analysis. IEEE Transactions on Neural Networks and Learning Systems. Apr. 2012; 23(4): 596-608.

Zhang et al., Face Detection Based on Multi Task Learning and Multi Layer Feature Fusion. 2017 6th International Conference on Computer Science and Network Technology (ICCSNT). 2017: 289-293.

U.S. Appl. No. 16/022,101, filed Jun. 28, 2018, Streit.
U.S. Appl. No. 16/539,824, filed Aug. 13, 2019, Streit.
U.S. Appl. No. 16/573,851, filed Sep. 17, 2019, Streit.
U.S. Appl. No. 16/832,014, filed Mar. 27, 2020, Streit.

PCT/US2019/021100, Aug. 26, 2019, International Search Report and Written Opinion.

PCT/US2019/039537, Sep. 30, 2019, International Search Report and Written Opinion.

U.S. Appl. No. 16/933,428, filed Jul. 20, 2020, Streit.

PCT/US2019/021100, Sep. 17, 2020, International Preliminary Report on Patentability.

International Search Report and Written Opinion dated Oct. 29, 2020 in connection with International Application No. PCT/US2020/046061.

International Preliminary Report on Patentability dated Sep. 17, 2020 in connection with International Application No. PCT/US2019/021100.

U.S. Appl. No. 16/993,596, filed Aug. 14, 2020, Streit.

PCT/US2020/046061, Oct. 29, 2020, International Search Report and Written Opinion.

Invitation to Pay Additional Fees dated Dec. 3, 2020 in connection with International Application No. PCT/US2020/050935.

International Preliminary Report on Patentability dated Jan. 7, 2021 in connection with International Application No. PCT/US2019/039537.

International Search Report and Written Opinion dated Feb. 3, 2021 in connection with International Application No. PCT/US2020/050935.

Rattani et al., Multi-biometic Convoutional Neural Networks for Mobile User Authentication. 2018 IEEE International Symposium on Technologies for Homeland Security (HST). 2018; pp. 1-6.

* cited by examiner

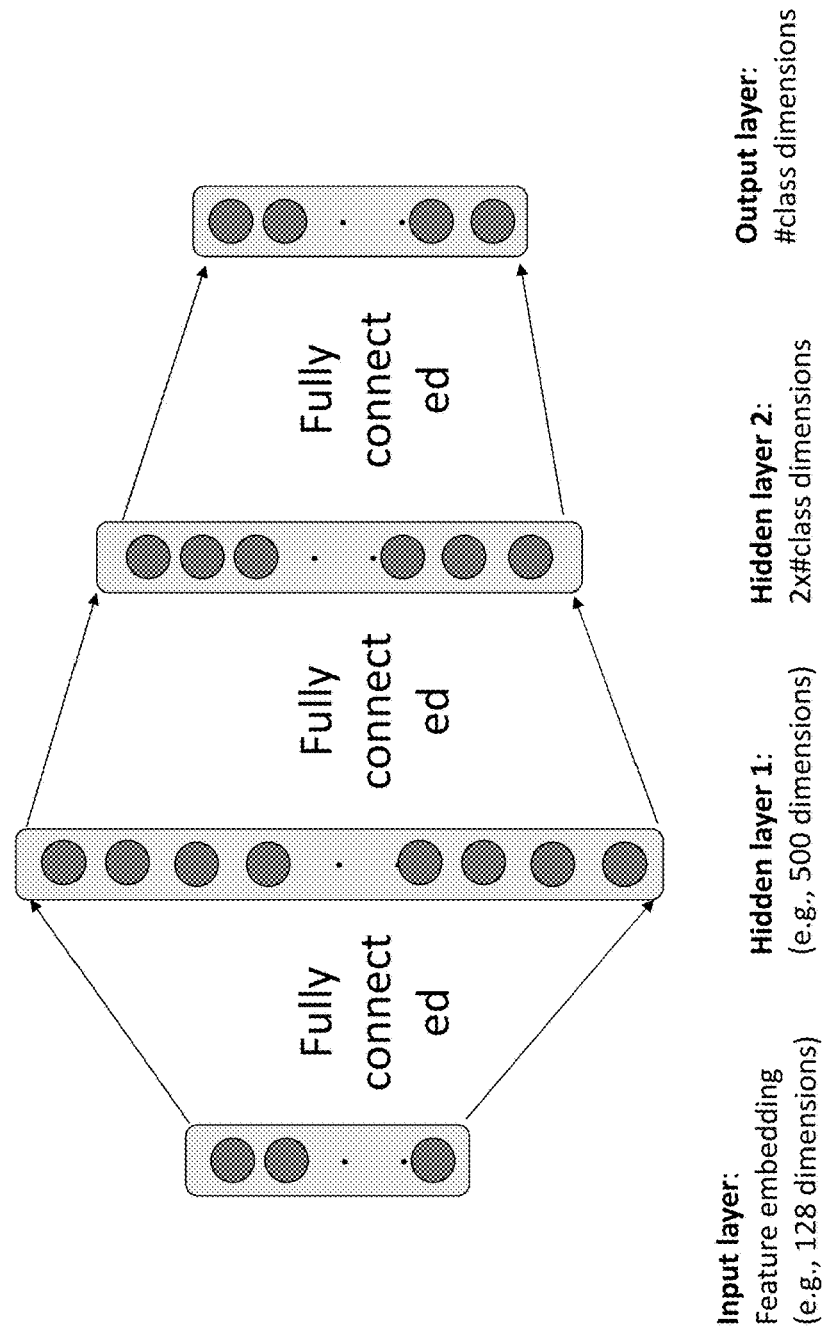

Test Generic Image Model

Job Status Done
- Initialized at 01:22:22 PM (1 second)
- Running at 01:22:23 PM (10 seconds)
- Done at 01:22:34 PM (Total = 12 seconds)

Infer Model Done ▶

Notes

None

Source image

Inference visualization softmax [[[ 7.73602103e-14]] [[ 2.21955698e-08]] [[ 2.79010940e-38]] [[ 4.65661884e-12]] [[ 1.22442035e-25]] [[ 1.14174363e-23]] [[ 2.08735890e-10]] [[ 5.50424920e-23]] [[ 1.41453549e-16]] [[ 1.00000000e+00]] [[ 3.83539471e-23]] [[ 1.06625418e-15]] [[ 4.15146406e-09]] [[ 4.18133693e-20]] [[ 1.62325844e-16]]]

FIG. 5B

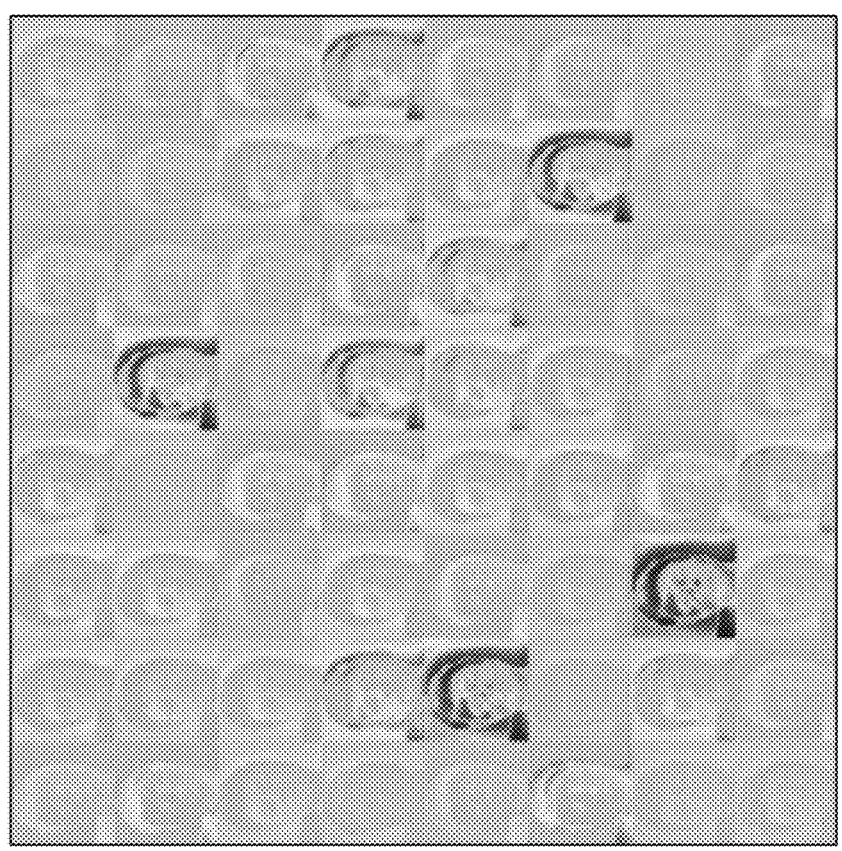
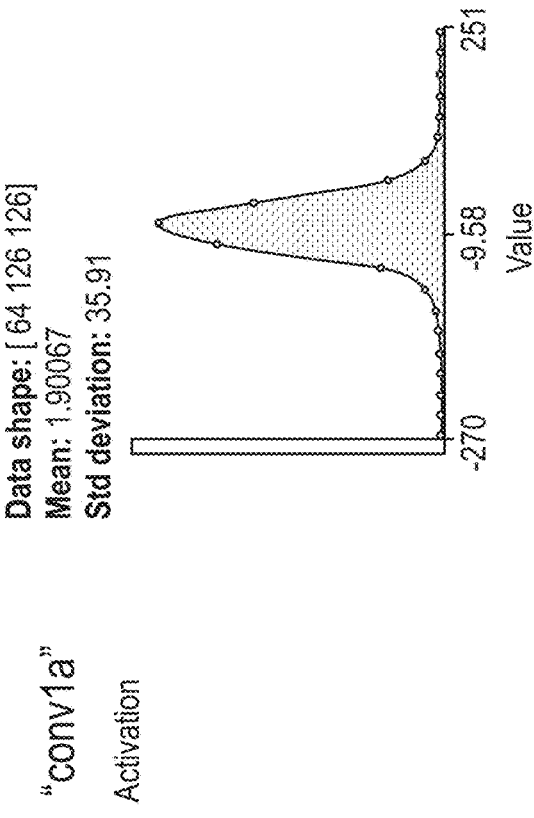
FIG. 5C

FIG. 8A

TABLE X. Liveness Implementations

| Id | Type | Strategy | Pros | Cons | Summary |
|---|---|---|---|---|---|
| 1 | Passive | 3D Camera | Does not impact user | As the third dimension solves a problem, 3D printers create a new and real vulnerability | Not efficient. Possible vulnerabilities exist as solutions that are 3D are potentially vulnerable to 3D printers |
| 2 | Passive | Detect blood pressure, or heart beat | Does not impact user | Difficult to read. Possibly could be simulated. | Not efficient. |
| 3 | Passive | Detect eyelid movement | Does not impact user | Difficult to read, and eye movement may be easily simulated in a video. | Not efficient due to a replay attack. |
| 4 | Active | Requested gesture from a set of gestures | More direct than passive | Spoof issue. Create a video of all possible gestures replay the gesture when requested | Easy to spoof. Relies on securing the set of gestures. |
| 5 | Active | Requested random gestures. | More direct than passive | The randomness too difficult to read for a large set of possibilities. Difficult to detect matches in large sets. | The larger the set of possibility gestures the more difficult it is to read. For this reason, inefficient |
| 6 | Active | Request words from a set of words. | Ease in detection | The entire set of requested words may be recorded and replayed | Inefficient due to replay. |

FIG. 8B

TABLE X (Continued)

| | | | | |
|---|---|---|---|---|
| 7 | Active | Request a random set of words | The randomness makes it impossible to record and replay | Devices may say the words as requested in place of the user. | Practical but with some limitations. |
| 8 | Active | Request random set of words in conjunction with a voice identity based on the same audio input | The word check in conjunction with identity prevents replay thorough a device. | Future devices | Practical. |

SYSTEMS AND METHODS FOR BIOMETRIC PROCESSING WITH LIVENESS

RELATED APPLICATIONS

This Application is a Continuation-in-part of U.S. application Ser. No. 15/914,562, filed Mar. 7, 2018, entitled "SYSTEMS AND METHODS FOR PRIVACY-ENABLED BIOMETRIC PROCESSING". This Application is a Continuation-in-part of U.S. application Ser. No. 15/914,942, filed Mar. 7, 2018, entitled "SYSTEMS AND METHODS FOR PRIVACY-ENABLED BIOMETRIC PROCESSING". This Application is a Continuation-in-part of U.S. application Ser. No. 15/914,969, filed Mar. 7, 2018, entitled "SYSTEMS AND METHODS FOR PRIVACY-ENABLED BIOMETRIC PROCESSING", which applications are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Biometrics offer the opportunity for identity assurance and identity validation. Many conventional uses for biometrics currently exist for identity and validation. These conventional approaches suffer from many flaws. Faked biometric or replayed biometric signals can be used to trick many conventional security systems.

SUMMARY

Conventional approaches to passive biometric collection and authentication have been shown to be vulnerable to faked credentials and/or simply not useable for authentication. Some other approaches have attempted to resolve these issues with active biometric collection, but similar flaws are still present. For example, in gesture based authentication systems, requests are made of a user based on a set of gestures, and the set of gestures itself can become a vulnerability. Even random gesture authentication can be tricked with pre-recorded gestures that are played in response to random requests. The inventors have realized that there is a need for a solution that provides biometric identification coupled with randomized biometric liveness detection. According to one aspect, coupling a liveness factor into identity assurance and validation (e.g., with liveness with biometric identity) resolves problems with conventional security, closing security holes that allow replay or faked biometric signals. Further embodiments incorporate random liveness checks (e.g., with random biometric requests (e.g., voice identification coupled with identification of random words or syllables)) as part of a multi-factor authentication. According to one embodiment, imaging and facial recognition is executed in conjunction with random liveness testing of a separate biometric (e.g., voice identification with random word requests) to complete authentication. In further embodiments, privacy enabled biometrics (e.g., privacy enabled facial recognition and/or voice identification) can be used in conjunction with the liveness augmented authentication.

According to one aspect, an authentication system can test liveness and test biometric identity using fully encrypted reference biometrics. According to various embodiments, the system is configured to execute comparisons directly on the encrypted biometrics (e.g., encrypted feature vectors of the biometric or encrypting embeddings derived from the unencrypted biometric) to determine authenticity with a learning neural network. In further embodiments, a first neural network is used to process unencrypted biometric inputs and generate Euclidean measurable encrypted feature vectors or encrypted embeddings. The encrypted feature vectors are used to train a classification deep neural network. Multiple learning networks (e.g., deep neural networks) can be trained and used to predict matches on different types of biometric input (e.g., facial/feature biometrics, voice biometrics, health/biologic data biometrics, etc.). In some examples, multiple biometric types can be processed into an authentication system to increase accuracy of identification.

According to one embodiment, a set of encrypted feature vectors or encrypted embeddings can be derived from any biometric data (e.g., using a first pre-trained neural network), and then using a deep neural network ("DNN") on those one-way homomorphic encryptions (i.e., each biometrics' feature vector or each biometrics embedding values) a system can determine matches or execute searches on the encrypted data. Each of the biometrics encrypted feature vectors/embeddings can then be stored and/or used in conjunction with respective classifications for use in subsequent comparisons without fear of compromising the original biometric data. In various embodiments, any unencrypted or original biometric data is discarded responsive to generating the encrypted values.

According to another aspect, an authentication system can also analyze an assurance factor while processing biometric input to ensure that the biometric input is generated by the individual seeking authentication (i.e., not pre-recorded or faked biometric signaling). In some embodiment, the authentication system is configured to request randomly selected instances (e.g., system random selection) of a biometric input (e.g., randomly selected words). The system as part of one process can evaluate the received voice information to determine an identity match, while processing the received voice information to ensure that received voice information matches the randomly selected words. In various embodiments, the authentication system is able to validate that an identity match (e.g., neural network prediction of identity) was supplied at the time requested and by the entity trying to confirm their identity (i.e. liveness testing) based on matching the input to the requested random words. In further embodiment, the system and/or connected devices can collect biometric information of multiple types (e.g., facial features and voice, among other options) to increase accuracy of identity matching, which can be further augmented with liveness detection to prevent spoofing or fraud.

According to one aspect, an authentication system for evaluating privacy-enabled biometrics and validating contemporaneous input of biometrics is provided. The system comprises at least one processor operatively connected to a memory; an interface, executed by the at least one processor configured to: receive a candidate set of instances of a first biometric data type input by a user requesting authentication; a classification component executed by the at least one processor, configured to: analyze a liveness threshold, wherein analyzing the liveness threshold includes processing the candidate set of instances to determine that the candidate set of instances matches a random set of instances; the classification component further comprising at least a first deep neural network ("DNN"), the classification component configured to: accept encrypted feature vectors (e.g., voice feature vectors, etc.), generated from a first neural network, the first neural network configured to process an unencrypted input of the first data type into the encrypted feature vectors; classify with the first DNN the encrypted feature vectors of the first biometric type during training, based on training the first DNN with encrypted feature vector and label inputs; return a label for person identification or an unknown result during prediction responsive to analyzing encrypted feature vectors with the first DNN; and confirm authentication based at least on the label and the liveness threshold.

According to one embodiment, the classification component is configured to: determine for values above the liveness threshold that the input matches the random set of instances; and determine for values below the threshold that a current authentication request is invalid. According to one embodiment, the system further comprises a liveness component, executed by the at least one processor, configured to generate a random set of instances of a first biometric type in response to an authentication request. According to one embodiment, the system is configured to request a user provide the candidate set of instances of the first biometric data type based on the generated random set of instances. According to one embodiment, the interface is configured to prompt user input of the randomly selected instances of the first biometric input to establish a threshold volume of biometric information confirmed at validation.

According to one embodiment, the classification component further comprises at least a second deep neural network ("DNN") configured to: accept encrypted feature vectors (e.g., face feature vectors, etc.), generated from a second neural network, the second neural network configured to process an unencrypted input of the second data type into the encrypted feature vectors; return a label for person identification or an unknown result during prediction responsive to analyzing encrypted feature vectors; and wherein the classification component is configured to confirm identification based on matching the label for person identification from the first and second DNNs.

According to one embodiment, the second DNN is configured to classify the encrypted feature vectors of the second biometric type during training, based on training the second DNN with encrypted feature vector and label inputs. According to one embodiment, the system further comprises the first neural network configured to process an unencrypted input of the first data type into the encrypted feature vectors. According to one embodiment, the system further comprises a pre-processing component configured to reduce a volume of unencrypted input biometric information for input into the first neural network. According to one embodiment, the classification component is configured to incrementally update the first DNN with new person labels and new persons feature vectors, based on updating null or undefined elements defined in the first DNN at training, and maintaining the network architecture and accommodating the unknown result for subsequent predictions without requiring full retraining of the first DNN. According to one embodiment, the system is configured to analyze the output values from the first DNN and based on positioning of the output values in an array and the values in those positions, determine the label or unknown.

According to one aspect, a computer implemented method or evaluating privacy-enabled biometrics and validating contemporaneous input of biometrics is provided. The method comprises: receiving, by at least one processor, a candidate set of instances of a first biometric data type input by a user requesting authentication; analyzing, by the at least on processor, a liveness threshold, wherein analyzing the liveness threshold includes processing the candidate set of instances to determine that the candidate set of instances matches a random set of instances; accepting, by a first deep neural network ("DNN") executed by the at least one processor, encrypted feature vectors (e.g., voice feature vectors, etc.), generated from a first neural network, the first neural network configured to process an unencrypted input of the first data type into the encrypted feature vectors; classifying, by the first DNN, the encrypted feature vectors of the first biometric type during training, based on training the first DNN with encrypted feature vector and label inputs; returning, by the first DNN, a label for person identification or an unknown result during prediction responsive to analyzing encrypted feature vectors; and confirming authentication based at least on the label and the liveness threshold.

According to one embodiment, the method further comprises: determining for values above the liveness threshold that the input matches the random set of instances; and determining for values below the threshold that a current authentication request is invalid. According to one embodiment, the method further comprises generating a random set of instances of a first biometric type in response to an authentication request. According to one embodiment, the method further comprises requesting a user provide the candidate set of instances of the first biometric data type based on the generated random set of instances.

According to one embodiment, the method further comprises prompting user input of the randomly selected instances of the first biometric input to establish a threshold volume of biometric information confirmed at validation. According to one embodiment, the method further comprises: accepting, by at least a second deep neural network, encrypted feature vectors (e.g., face feature vectors, etc.), generated from a second neural network, the second neural network configured to process an unencrypted input of the second data type into the encrypted feature vectors; returning, by the second DNN a label for person identification or an unknown result during prediction responsive to analyzing encrypted feature vectors; and confirming identification based on matching the label for person identification from the first and second DNNs.

According to one embodiment, the second DNN is configured to classify the encrypted feature vectors of the second biometric type during training, based on training the second DNN with encrypted feature vector and label inputs. According to one embodiment, the method further comprises processing, by the first neural network, an unencrypted input of the first data type into the encrypted feature vectors. According to one embodiment, the method further comprises incrementally updating the first DNN with new person labels and new persons feature vectors, based on updating null or undefined elements established in the first DNN at training, and maintaining the architecture of the first DNN and accommodating the unknown result for subsequent predictions without requiring full retraining of the first DNN.

According to one aspect, an authentication system for evaluating privacy-enabled biometrics and contemporaneous input of biometrics for processing is provided. The system comprises at least one processor operatively connected to a memory, the at least one processor configured to generate in response to an authentication request, a random set of instances of a first biometric input of a first biometric data type (e.g., random words), an interface, executed by the at least one processor configured to: receive a candidate set of instances of a first biometric data type input by a user requesting authentication, for example, wherein the interface is configured to prompt a user to submit the first biometric input according to the randomly selected set of instances (e.g., display random words); a classification component executed by the at least one processor, configured to: analyze a liveness threshold; determine for values above the liveness threshold that the user is submitting the biometric information concurrent with or responsive to the authentication request; determine for values below the threshold that a current authentication request is unacceptable (e.g., invalid or incorrect, etc.), wherein analyzing the liveness threshold includes processing the candidate set of instances to determine a confidence value that the candidate set of instances matches the random set of instances generated by the at least one processor; the classification component further comprising at least a first deep neural network ("DNN"), the classification component configured to: accept encrypted embeddings (e.g., feature vectors) generated with a first neural network ("NN") for processing the first data type of an unencrypted biometric input (e.g., pre-trained NN to classify the biometric input (e.g., your custom trained NN for voice, etc.)); classify embeddings (e.g., feature vectors) of the first type and label inputs during training based on processing the encrypted embeddings (e.g., feature vectors) obtained from the first neural network using the first DNN, return a label for person identification or an unknown result during prediction responsive to processing the encrypted embeddings from the candidate set of instances of the first biometric with the first DNN; and confirm authentication based on the person identification and the liveness threshold.

According to one embodiment, the system further comprises a feature vector generation component comprising a pre-trained neural network configured to generate Euclidean measurable encrypted feature vectors as an output of a least one layer in the neural network responsive to input of an unencrypted biometric input.

According to one aspect, an authentication system for evaluating privacy-enabled biometrics and liveness, the system comprising: at least one processor operatively connected to a memory; an interface configured to: accept a first biometric input associated with a first biometric data type (e.g., video or imaging); accept a second biometric input associated with a second biometric type, wherein the interface is configured to prompt a user to provide the second biometric input according to randomly selected instances of the second biometric input (e.g., the second biometric input providing voice and the randomly selected instances providing liveness); a classification component executed by the at least one processor, comprising at least a first and second deep neural network ("DNN"), the classification component configured to: accept encrypted feature vectors generated with a first classification neural network for processing a first type of an unencrypted biometric (e.g., pre-trained NN to classify the biometric input (e.g., FACENET, etc.)); accept encrypted feature vectors generated with a second classification neural network for processing a second type of an unencrypted biometric (e.g., custom pre-trained NN to classify voice identity—i.e. generate Euclidean measurable feature vectors); classify feature vector of the first type and label inputs during training based on processing the encrypted feature vectors from the first classification neural network using the first DNN, and return a label for person identification or an unknown result during prediction responsive to processing an unclassified encrypted biometric input of the first type with the first DNN; classify feature vector of the second type and label inputs during training based on processing the encrypted feature vectors from the second classification neural network using the second DNN, and return a label for person identification or an unknown result during prediction responsive to processing an unclassified encrypted biometric input of the second type with the second DNN; analyze an assurance factor derived from the randomly selected instances of the second biometric input, to determine that the input biometric information matches the randomly selected instances of the second biometric input, and to determine the input of the first and second biometric is contemporaneous with the authentication request; and confirm authentication based on the person identification resulting from the prediction executed by the first and second DNN and the assurance factor.

According to another aspect, encrypted search can be executed on the system in polynomial time, even in a one to many use case. This feature enables scalability that conventional systems cannot perform and enables security/privacy unavailable in many conventional approaches.

According to one aspect a privacy-enabled biometric system is provided. The system comprises at least one processor operatively connected to a memory; a classification component executed by the at least one processor, comprising a classification network having a deep neural network ("DNN") configured to classify feature vector inputs during training and return a label for person identification or an unknown result during prediction; and the classification component is further configured to accept as an input feature vectors that are Euclidean measurable and return the unknown result or the label as output.

According to one embodiment, a set of biometric feature vectors is used for training in the DNN neural network for subsequent prediction. According to one embodiment, biometrics are morphed a finite number of times to create additional biometrics for training of the second (classification) neural network. The second neural network is loaded with the label and a finite number of feature vectors based on an input biometric. According to one embodiment, the classification component is configured to accept or extract from another neural network Euclidean measurable feature vectors. According to one embodiment, the another neural network comprises a pre-trained neural network. According to one embodiment, this network takes in a plaintext biometric and returns a Euclidean measureable feature vector that represents a one-way encrypted biometric. According to one embodiment, the classification neural network comprises a classification based deep neural network configured for dynamic training with label and feature vector input pairs to training. According to one embodiment, a feature vector is input for prediction.

According to one embodiment, the system further comprises a preprocessing component configured to validate plaintext biometric input. According to one embodiment, only valid images are used for subsequent training after the preprocessing. According to one embodiment, the classification component is configured with a plurality of modes of execution, including an enrollment mode configured to accept, as input, a label and feature vectors on which to train the classification network for subsequent prediction. According to one embodiment, the classification component is configured to predict a match, based on a feature vector as input, to an existing label or to return an unknown result.

According to one embodiment, the classification component is configured to incrementally update an existing model, maintaining the network architecture (e.g., weighting values, loss function values, etc.) and accommodating the unknown result for subsequent predictions. In various embodiments, incremental updating the existing model avoids re-training operations that conventional approaches require. According to one embodiment, the system is configured to analyze the output values and based on their position and the values, determine the label or unknown.

According to one embodiment, the classification network further comprises an input layer for accepting feature vectors of a number of dimensions, the input layer having a number of classes at least equal to the number of dimensions of the feature vector input, first and a second hidden layers, and an output layer that generates an array of values. According to one embodiment, the fully connected neural network further comprises an input layer for accepting feature vectors of a number of dimensions, the input layer having a number of nodes at least equal to the number of dimensions of the feature vector input, a first hidden layer of at least 500 dimensions, a second hidden layer of at least twice the number of input dimensions, and an output layer that generates an array of values—that based on their position in the array and the values at respective positions, determine the label or an unknown. According to one embodiment, a set of biometric feature vectors is used for training the DNN neural network for subsequent prediction.

According to one aspect a computer implemented method for executing privacy-enabled biometric training is provided. The method comprises instantiating, by at least one processor, a classification component comprising classification network having a deep neural network ("DNN") configured to classify feature vector inputs during training and return a label for person identification or an unknown result during prediction; accepting, by the classification component, as an input feature vectors that are Euclidean measurable and a label for training the classification network; and Euclidean measurable feature vectors for prediction functions with the classification network; and classifying, by a classification component executed on at least one processor, the feature vector inputs and the label during training.

According to one embodiment, the method further comprises accepting or extracting, by the classification component, from another neural network the Euclidean measurable feature vectors. According to one embodiment, the another neural network comprises a pre-trained neural network. According to one embodiment, the classification neural network comprises a classification based deep neural network configured for dynamic training with label and feature vector input pairs. According to one embodiment, the method further comprises an act of validating input biometrics used to generate a feature vector. According to one embodiment, the method further comprises an act of triggering a respective one of a plurality of modes of operation, including an enrollment mode configured to accept a label and feature vectors for an individual. According to one embodiment, the method further comprises an act of predicting a match to an existing label or returning an unknown result responsive to accepting a biometric feature vector as input.

According to one embodiment, method further comprises an act of updating the classification network with respective vectors for use in subsequent predictions. To handle the case of a person's looks changing over time, the input for prediction, may be used to re-train the individual. According to one embodiment, the method further comprises an act of updating, incrementally, an existing node in the classification network and maintaining the network architecture to accommodate the feature vector for subsequent predictions. According to one embodiment, the classification network further comprises an input layer for accepting feature vectors of a number of dimensions, the input layer having a number of nodes at least equal to the number of dimensions of the feature vector input, a first and second hidden layer and an output layer that generates an array of values.

According to one aspect a non-transitory computer readable medium containing instructions when executed by at least one processor cause a computer system to execute a method for executing privacy-enabled biometric analysis, the method is provided. A method comprises an instantiating, a classification component comprising a classification network having a deep neural network ("DNN") configured to classify feature vector and label inputs during training and return a label for person identification or an unknown result during prediction; accepting, by the classification component, as an input feature vectors that are Euclidean measurable as an input and a label for training the classification network, and Euclidean measurable feature vectors for prediction functions with the classification network; and classifying, by a classification component executed on at least one processor, the feature vector inputs and the label during training.

According to one embodiment, the method further comprises an act of accepting or extracting, by the classification component, from another neural network Euclidean measurable feature vectors. According to one embodiment, the another neural network comprises a pre-trained neural network. According to various embodiments, the computer readable medium contains instructions to perform any of the method steps above, individually, in combination, or in any combination.

According to one aspect a privacy-enabled biometric system is provided. The system comprises a classification means comprising a classifying deep neural network ("DNN") executed by at least one processor the FCNN configured to: classify feature vector inputs and return a label for person identification or an unknown result as a prediction; and accept as an input, feature vectors that are Euclidean measurable and a label as an instance of training.

According to one aspect, a privacy-enabled biometric system is provided. The system comprises at least one processor operatively connected to a memory; a classification component executed by the at least one processor, including a classification network having a deep neural network ("DNN") configured to classify feature vector inputs during training and return a label for person identification or an unknown result during prediction, wherein the classification component is further configured to accept as an input feature vectors that are Euclidean measurable; a feature vector generation component comprising a pre-trained neural network configured to generate Euclidean measurable feature vectors as an output of a least one layer in the neural network responsive to input of an unencrypted biometric input.

According to one embodiment, the classification component is further configured to accept one way homomorphic, Euclidean measurable vectors, and labels for person identification as input for training. According to one embodiment, the classification component is configured to accept or extract from the pre-trained neural network the feature vectors. According to one embodiment, the pre-trained neural network includes an output generation layer which provides Euclidean Measureable feature vectors. According to one embodiment, the classification network comprises a deep neural network suitable for training and, for prediction, output of a list of values allowing the selection of labels or unknown as output. According to one embodiment, the pre-trained network generates feature vectors on a first biometric type (e.g., image, voice, health data, iris, etc.); and the classification component is further configured to accept feature vectors from a another neural network that generates Euclidean measurable feature vectors on a another biometric type.

According to one embodiment, the system is configured to instantiate multiple classification networks each associated with at least one different biometric type relative to another classification network, and classify input feature vectors based on executing at least a first or second classification network. the system is configured to execute a voting procedure to increase accuracy of identification based According to one embodiment, on multiple biometric inputs or multiple types of biometric input. According to one embodiment, the system is configured to maintain at least an executing copy of the classifying network and an updatable copy of classification network that can be locked or put in an offline state to enable retraining operations while the executing copy of the classifying network handles any classification requests. According to one embodiment, the classification component is configured with a plurality of modes of execution, including an enrollment mode configured to accept a label for identification and the input feature vectors for an individual from the feature vector generation component.

According to one embodiment, the classification component is configured to predict a match to an existing label or to return an unknown result based on feature vectors enrolled in the classification network. According to one embodiment, the classification component is configured to incrementally update an existing node in the neural network maintaining the network architecture and accommodating the unknown result for subsequent predictions. According to one embodiment, the classification network further comprises an input layer for accepting feature vectors of a number of dimensions, the input layer having a number of nodes at least equal to the number of dimensions of the feature vector input, a first hidden layer, a second hidden layer, and an output layer that generates hat generates an array of values that based on their position and the values, determine the label or unknown. According to one embodiment, the classification network further comprises a plurality of layers including two hidden layers and an output layer having a number of nodes at least equal to the number of dimensions of the feature vector input.

According to one aspect a computer implemented method for executing privacy-enabled biometric analysis, the method is provided. The method further comprises instantiating, by at least one processor, a classification component comprising a deep neural network ("DNN") configured to classify feature vector inputs during training and return a label for person identification or an unknown result during prediction, and a feature vector generation component comprising a pre-trained neural network; generating, by the feature vector generation component Euclidean measurable feature vectors as an output of a least one layer in the pre-trained neural network responsive to input of an unencrypted biometric input; accepting, by the classification component, as an input feature vectors that are Euclidean measurable generated by the feature vector generation component and a label for training the classification network, and Euclidean measurable feature vectors for prediction functions with the classification network; and classifying, by a classification component executed on at least one processor, the feature vector inputs and the label during training.

According to one embodiment, the method further comprises accepting or extracting, by the classification network the Euclidean measurable feature vectors from the pre-trained neural network. According to one embodiment, the second neural network comprises a pre-trained neural network. According to one embodiment, the method further comprises an act of validating input feature vectors as Euclidean measurable. According to one embodiment, the method further comprises generating, by the classification component feature vectors on a first biometric type (e.g., image, voice, health data, iris, etc.); and accepting, by the classification component, feature vectors from another neural network that generates Euclidean measurable feature vectors on a second biometric type.

According to one embodiment, method further comprises: instantiating multiple classification networks each associated with at least one different biometric type relative to another classification network, and classifying input feature vectors based on applying at least a first or second classification network. According to one embodiment, the method further comprises executing a voting procedure to increase accuracy of identification based on multiple biometric inputs or multiple types of biometric input and respective classifications. According to one embodiment, for a biometric to be considered a match, it must receive a plurality of votes based on a plurality of biometrics. According to one embodiment, the method further comprises instantiating multiple copies of the classification network to enable at least an executing copy of the classification network, and an updatable classification network that can be locked or put in an offline state to enable retraining operations while the executing copy of the classification network handles any classification requests. According to one embodiment, the method further comprises predicting a match to an existing label or to return an unknown result based, at least in part, on feature vectors enrolled in the classification network. According to one embodiment, the method further comprises updating, incrementally, an existing model in the classification network maintaining the network architecture and accommodating the unknown result for subsequent predictions.

According to one aspect a non-transitory computer readable medium containing instructions when executed by at least one processor cause a computer system to execute a method for executing privacy-enabled biometric analysis, the method is provided. The method comprises instantiating a classification component comprising a deep neural network ("DNN") configured to classify feature vector and label inputs during training and return a label for person identification or an unknown result during prediction, and a feature vector generation component comprising a pre-trained neural network; generating, by the feature vector generation component Euclidean measurable feature vectors as an output of a least one layer in the pre-trained neural network responsive to input of an unencrypted biometric input; accepting, by the classification component, as an input feature vectors that are Euclidean measurable generated by the feature vector generation component and a label for training the classification network, and Euclidean measurable feature vectors for prediction functions with the classification network; and classifying, by a classification component executed on at least one processor, the feature vector inputs and the label during training. According to various embodiments, the computer readable medium contains instructions to perform any of the method steps above, individually, in combination, or in any combination.

According to one aspect a privacy-enabled biometric system is provided. The system comprises a feature vector generation means comprising a pre-trained neural network configured to generate Euclidean measurable feature vectors responsive to an unencrypted biometric input; a classification means comprising a deep neural network ("DNN") configured to: classify feature vector and label inputs and return a label for person identification or an unknown result for training; and accept feature vectors that are Euclidean measurable as inputs and return a label for person identification or an unknown result for prediction.

According to one aspect a privacy-enabled biometric system is provided. The system comprises at least one processor operatively connected to a memory; a classification component executed by the at least one processor, including a classification network having a deep neural network ("DNN") configured to classify feature vector and label inputs during training and return a label for person identification or an unknown result during prediction, wherein the classification component is further configured to accept as an input feature vectors that are Euclidean measurable; the classification network having an architecture comprising a plurality of layers: at least one layer comprising nodes associated with feature vectors, the at least one layer having an initial number of identification nodes and a subset of the identification nodes that are unassigned; the system responsive to input of biometric information for a new user is configured to trigger an incremental training operation for the classification network integrating the new biometric information into a respective one of the unallocated identification nodes usable for subsequent matching.

According to one embodiment, the system is configured to monitor allocation of the unallocated identification nodes and trigger a full retraining of the classification network responsive to assignment of the subset of unallocated nodes. According to one embodiment, the system is configured to execute a full retraining of the classification network to include additional unallocated identification nodes for subsequent incremental retraining of the DNN. According to one embodiment, the system iteratively fully retrains the classification network upon depletion of unallocated identification nodes with additional unallocated nodes for subsequent incremental training. According to one embodiment, the system is further configured to monitor matching of new biometric information to existing identification nodes in the classification network.

According to one embodiment, the system is further configured trigger integration of new biometric information into existing identification nodes responsive to exceeding a threshold associated with matching new biometric information. According to one embodiment, the pre-trained network is further configured to generate one way homomorphic, Euclidean measurable, feature vectors for the individual. According to one embodiment, the classification component is further configured to return a set of probabilities for matching a set of existing labels. According to one embodiment, the classification component is further configured to predict an outcome based on a trained model, a set of inputs for the prediction and a result of a class or unknown (all returned values dictating UNKNOWN).

According to one embodiment, the classification component is further configured to accept the feature vector inputs from a neural network model that generates Euclidean measurable feature vectors. According to one embodiment, the classification component is further configured to extract the feature vectors from the neural network model from layers in the model. According to one embodiment, the system further comprising a feature vector component executed by the at least one processor comprising a neural network. According to one embodiment, the feature vector component is configured to extract the feature vectors during execution of the neural network from layers. According to one embodiment, the neural network comprises of a set of layers wherein one layer outputs Euclidean Measurable Feature Vectors. According to one embodiment, the system further comprising a retraining component configured to monitor a number of new input feature vectors or matches of new biometric information to a label and trigger retraining by the classification component on the new biometric information for the label. This can be additional training on a person, using predict biometrics, that continues training as a biometric changes over time. The system may be configured to do this based on a certain number of consecutive predictions or may do it chronologically, say once every six months.

According to one embodiment, the classification component is configured to retrain the neural network on addition of new feature vectors. According to one embodiment, the neural network is initially trained with unallocated people classifications, and the classification component is further configured to incrementally retrain the neural network to accommodate new people using the unallocated classifications. According to one embodiment, the system further comprises a retraining component configured to: monitor a number of incremental retraining; trigger the classifier component to fully retrain the neural network responsive to allocation of the unallocated classifications. According to one embodiment, the classification component is configured to fully retrain the neural network to incorporate unallocated people classifications, and incrementally retrain for new people using the unallocated classifications. According to one embodiment, the classification component further comprises multiple neural networks for processing respective types of biometric information. According to one embodiment, the classification component is further configured to generate an identity of a person responsive to at least two probable biometric indicators that may be used simultaneously or as part of a "voting" algorithm.

According to one aspect a computer implemented method for privacy-enabled biometric analysis is provided. The method comprises instantiating, by at least one processor, a classification component comprising a classification network having a deep neural network ("DNN") configured to classify feature vector and label inputs during training and return a label for person identification or an unknown result during prediction, and wherein the classification component is further configured to accept as an input feature vectors that are Euclidean measurable and return the unknown result or the label as output; instantiating the classification component includes an act of allocating within at least one layer of the classification network, an initial number of classes and having a subset of the class slots that are unassigned; triggering responsive to input of biometric information for a new user incremental training operation for the classification network integrating the new biometric information into a respective one of the unallocated class slots usable for subsequent matching.

According to one embodiment, the method further comprises acts of accepting, by the classification component, as an input feature vectors that are Euclidean measurable generated by a feature vector generation component; classifying, by the classification component executed on at least one processor, the feature vector inputs; and returning, by the classification component, a label for person identification or an unknown result. According to one embodiment, the method further comprises acts of instantiating a feature vector generation component comprising a pre-trained neural network; and generating, by the feature vector generation component Euclidean measurable feature vectors as an output of a least one layer in the pre-trained neural network responsive to input of an unencrypted biometric input. According to one embodiment, the method further comprises an act of monitoring, by the at least one processor, allocation of the unallocated identification classes and triggering an incremental retraining of the classification network responsive to assignment of the subset of unallocated nodes to provide additional unallocated classes.

According to one embodiment, the method further comprises an act of monitoring, by the at least one processor, allocation of the unallocated identification nodes and triggering a full retraining or incremental of the classification network responsive to assignment of the subset of unallocated nodes. According to one embodiment, the method further comprises an act of executing a full retraining of the classification network to include additional unallocated classes for subsequent incremental retraining of the DNN. According to one embodiment, the method further comprises an act of fully retraining the classification network iteratively upon depletion of unallocated identification nodes, the full retraining including an act of allocating additional unallocated nodes for subsequent incremental training. According to one embodiment, the method further comprises an act of monitoring matching of new biometric information to existing identification nodes. According to one embodiment, the method further comprises an act of triggering integration of new biometric information into existing identification nodes responsive to exceeding a threshold associated with matching new biometric information. According to one embodiment, the method further comprises an act of generating one way homomorphic, Euclidean measurable, labels for person identification responsive to input of Euclidean measurable feature vectors for the individual by the classification component.

According to one aspect a non-transitory computer readable medium containing instructions when executed by at least one processor cause a computer system to execute a method instantiating a classification component comprising a classification network having a deep neural network ("DNN") configured to classify feature vector and label inputs during training and return a label for person identification or an unknown result during prediction, and wherein the classification component is further configured to accept as an input feature vectors that are Euclidean measurable and return the unknown result or the label as output; instantiating the classification component includes an act of allocating within at least one layer of the classification network, an initial number of classes and having a subset of additional classes that are unassigned; triggering responsive to input of biometric information for a new user incremental training operation for the classification network integrating the new biometric information into a respective one of the unallocated identification nodes usable for subsequent matching. According to various embodiments, the computer readable medium contains instructions to perform any of the method steps above, individually, in combination, or in any combination.

According to one aspect a privacy-enabled biometric system is provided. The system comprises at least one processor operatively connected to a memory; a classification component executed by the at least one processor, comprising classification network having a deep neural network configured to classify Euclidean measurable feature vectors and label inputs for person identification during training, and accept as an input feature vectors that are Euclidean measurable and return an unknown result or the label as output; and an enrollment interface configured to accept biometric information and trigger the classification component to integrate the biometric information into the classification network.

According to one embodiment, the enrollment interface is accessible via uri, and is configured to accept unencrypted biometric information and personally identifiable information ("PII"). According to one embodiment, the enrollment interface is configured to link the PII to a one way homomorphic encryption of an unencrypted biometric input. According to one embodiment, the enrollment interface is configured to trigger deletion of the unencrypted biometric information. According to one embodiment, the system is further configured to enroll an individual for biometric authentication; and the classification component is further configured to accept input of Euclidean measurable feature vectors for person identification during prediction. According to one embodiment, the classification component is further configured to return a set of probabilities for matching a feature vector. According to one embodiment, the classification component is further configured to predict an outcome based on a trained model, a set of inputs for the prediction and a result of a class (persons) or UNKNOWN (all returned values dictating UNKNOWN).

According to one embodiment, the system further comprises an interface configured to accept a biometric input and return and indication of known or unknown to a requesting entity. According to one embodiment, requesting entity includes any one or more of: an application, a mobile application, a local process, a remote process, a method, and a business object. According to one embodiment, the classification component further comprising multiple classification networks for processing different types of biometric information. According to one embodiment, the classification component is further configured to match an identity of a person responsive to at least two probable biometric indicators that may be used simultaneously or as part of a voting algorithm. According to one embodiment, the classification network further comprises an input layer for accepting feature vectors of a number of dimensions, the input layer having a number of classes at least equal to the number of dimensions of the feature vector input, a first and second hidden layer, and an output layer that generates an array of values.

According to one aspect a computer implemented method for privacy-enabled biometric analysis, the method is provided. The method comprises instantiating, by at least one processor, a classification component comprising a full deep neural network configured to classify feature vectors that are Euclidean measurable and a label inputs for person identification during training, and accept as an input feature vectors that are Euclidean measurable and return an unknown result or the label as output during prediction, and an enrollment interface; accepting, by the enrollment interface, biometric information associated with a new individual; triggering the classification component to train the classification network on feature vectors derived from the biometric information and a label for subsequent identification; and return the label through for subsequent identification.

According to one embodiment, an instantiating the enrollment interface included hosting a portal accessible via uri, and the method includes accepting biometric information and personally identifiable information ("PII") through the portal. According to one embodiment, the method further comprises linking the PII to a one way homomorphic encryption of an unencrypted biometric input. According to one embodiment, the method further comprises triggering deletion of unencrypted biometric information on a submitting device. According to one embodiment, method further comprises enrolling individuals for biometric authentication; and mapping labels and respective feature vectors for person identification, responsive to input of Euclidean measurable feature vectors and a label for the individual. According to one embodiment, the method further comprises returning a set of probabilities for matching a set of existing labels.

According to one embodiment, the method further comprises predicting an outcome based on a trained model, a set of inputs for the prediction and a result of a class (e.g., persons) or unknown (e.g., all returned values dictating UNKNOWN). According to one embodiment, the method further comprises accepting via an authentication interface a biometric input and returning and indication of known or unknown to a requesting entity. According to one embodiment, the requesting entity includes any one or more of: an application, a mobile application, a local process, a remote process, a method, and a business object. According to one embodiment, the method further comprises processing different types of biometric information using multiple classification networks. According to one embodiment, the method further comprises generating an identity of a person responsive to at least two probable biometric indicators that may be used simultaneously or as part of a voting algorithm.

According to one embodiment, the classification network further comprises an input layer for accepting feature vectors of a number of dimensions, the input layer having a number of classes at least equal to the number of dimensions of the feature vector input, a second hidden layer of at least twice the number of input dimensions, and an output layer that generates an array of values. According to one embodiment, the fully connected neural network further comprises an input layer for accepting feature vectors of a number of dimensions, the input layer having a number of nodes at least equal to the number of dimensions of the feature vector input, a first hidden layer of at least 500 dimensions, a second hidden layer of at least twice the number of input dimensions, and an output layer that generates an array of values that based on their position and the values, determine the label or unknown.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," " this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 4A-D are a diagrams of embodiments of a fully connected neural network for classification;

Figure 5B:
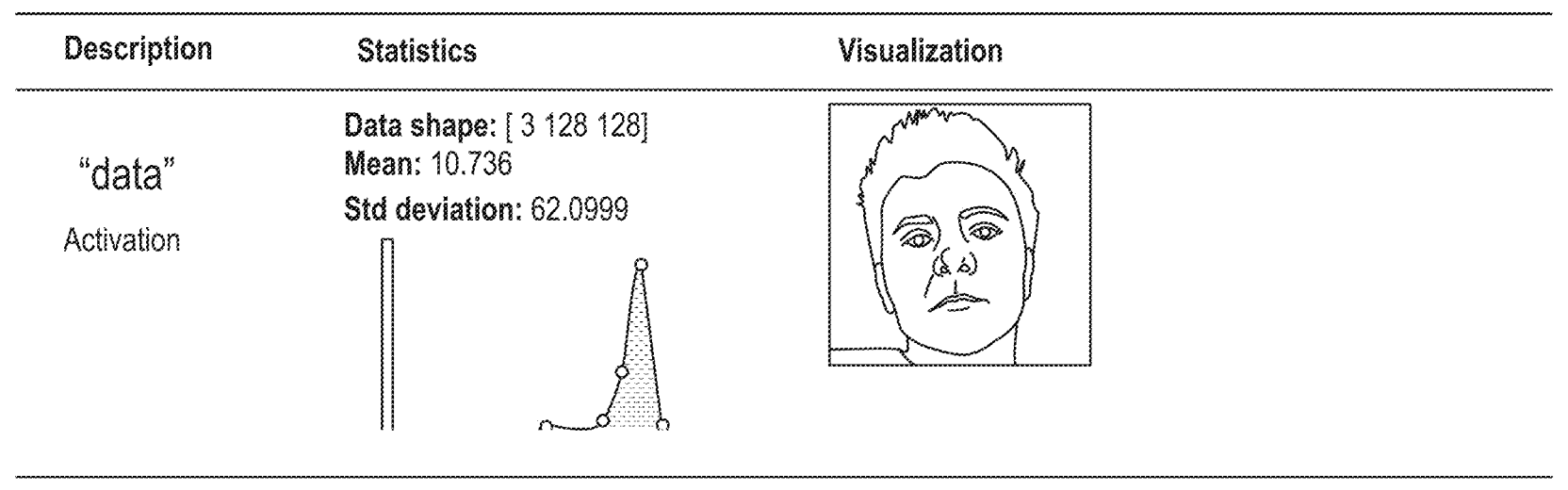

FIG. 5A-D illustrate example processing steps and example outputs during identification, according to one embodiment;

FIG. 8A-B is a table showing comparative considerations of example implementation, according to various embodiments;

DETAILED DESCRIPTION

Figure 1:
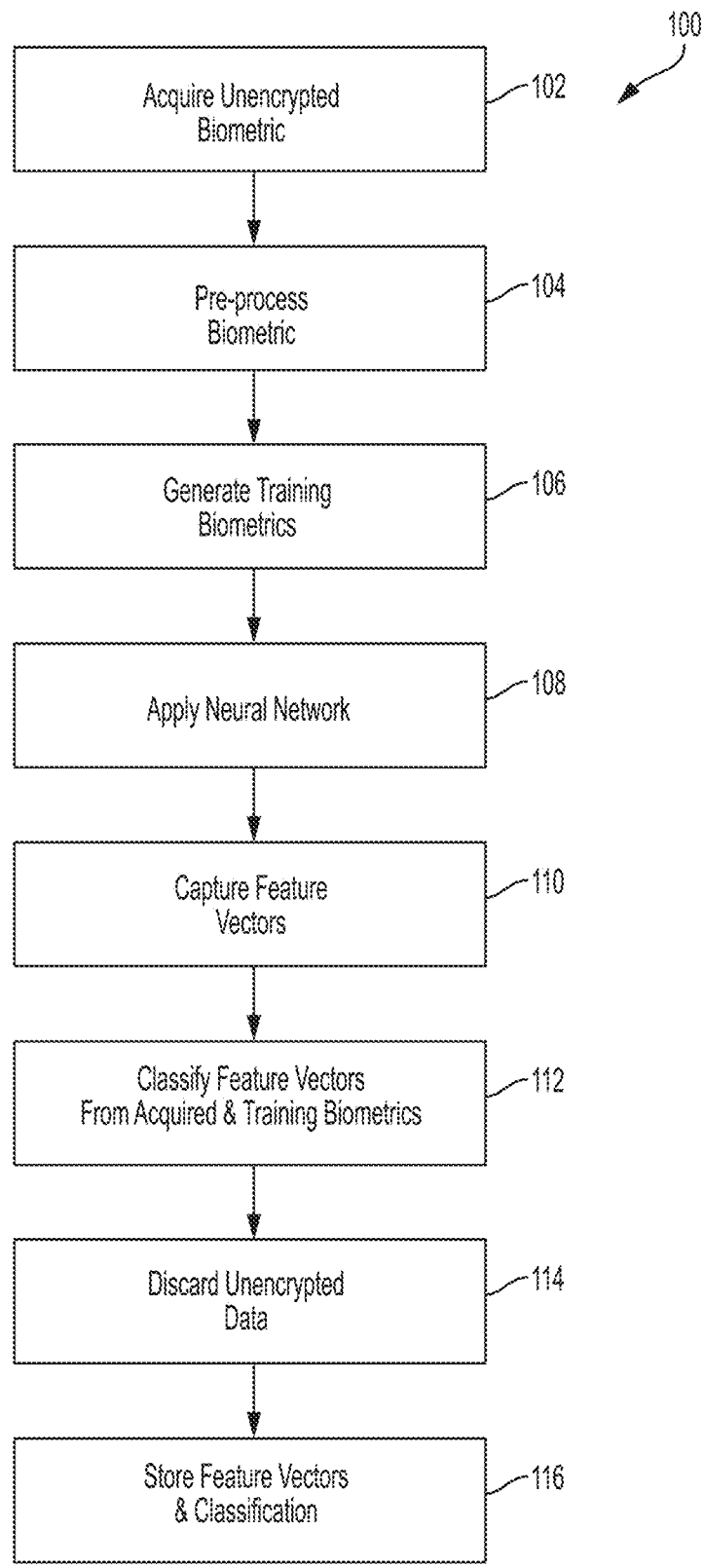
FIG. 1 is an example process flow for classifying biometric information, according to one embodiment.

According to some embodiments, the system is configured to provide one to many search and/or matching on encrypted biometrics in polynomial time. According to one embodiment, the system takes input biometrics and transforms the input biometrics into feature vectors (e.g., a list of floating point numbers (e.g., 64, 128, 256, or within a range of at least 64 and 10240, although some embodiments can use more feature vectors)). According to various embodiments, The number of floating point numbers in each list depends on the machine learning model being employed to process input encrypted biometric information. For example, the known FACENET model by GOOGLE generates a feature vector list of 128 floating point numbers, but other embodiments use models with different feature vectors and, for example, lists of floating point numbers.

In another example, the inventors have created a first neural network for processing plain or unencrypted voice input. The voice neural network is used to accept unencrypted voice input and to generate embeddings or feature vectors that are encrypted and Euclidean measurable for use in training another neural network. In various embodiments, the first voice neural network generates encrypted embeddings that are used to train a second neural network, that once trained can generate predictions on further voice input (e.g., match or unknown). In one example, the second neural network (e.g., a deep neural network—DNN) is trained to process unclassified voice inputs for authentication (e.g., predicting a match). In some embodiments, the feature vectors generated for voice can be a list of 64 floating point numbers, but similar ranges of floating points numbers to the FACENET implementations (discussed in greater detail below) can also be used (e.g., 32 floating point numbers up to 10240 floating point numbers, among other options).

According to one aspect, by executing on embedding or feature vectors that are encrypted and Euclidean measureable the system produces and operates in a privacy preserving manner. These encryptions (e.g., one way homomorphic encryptions) can be used in encrypted operations (e.g., addition, multiplication, comparison, etc.) without knowing the underlying plaintext value. Thus, the original or input biometric can simply be discarded, and does not represent a point of failure for security thereafter. In further aspects, implementing one way encryptions eliminates the need for encryption keys that can likewise be compromised. This is a failing of many convention systems.

According to various aspects, the privacy enabled by use of encrypted biometrics can be further augmented with liveness detection to prevent faked or spoofed biometric credentials from being used. According to some embodiments, the system can analyze an assurance factor derived from randomly selected instances (e.g., selected by the system) of a biometric input, to determine that input biometric information matches the set of randomly selected instances of the biometric input. The assurance factor and respective execution can be referred to as a "liveness" test. According to various embodiments, the authentication system can validate the input of biometric information for identity and provide assurance the biometric information was not faked via liveness testing.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 7:
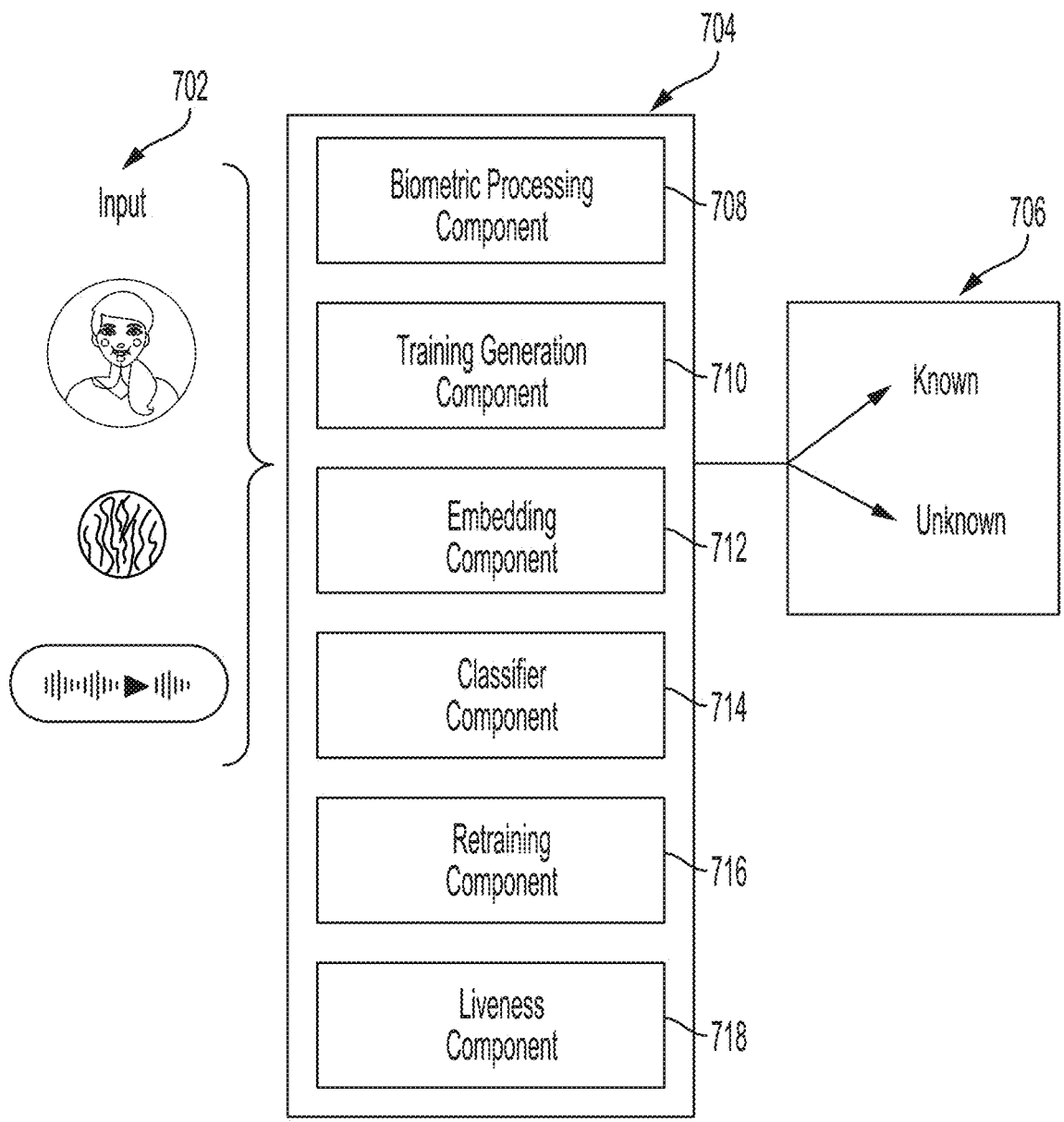
FIG. 7 is a block diagram of an embodiment of a privacy-enabled biometric system with liveness validation, according to one embodiment.

FIG. 7 is a block diagram of an example privacy-enabled biometric system 704 with liveness validation. According to some embodiments, the system can be installed on a mobile device or called from a mobile device (e.g., on a remote server or cloud based resource) to return an authenticated or not signal. In various embodiments, system 704 can execute any of the following processes. For example, system 704 can enroll users (e.g., via process 100), identify enrolled users (e.g., process 200), and search for matches to users (e.g., process 250). In various embodiments, system 704 includes multiple pairs of neural networks, where each pair includes a processing neural network for accepting an unencrypted biometric input (e.g., images or voice, etc.) and generating an encrypted embedding or feature vector. Each pair can include a classification neural network than can be trained on the encrypted feature vectors to classify the encrypted information with labels, and that is further used to predict a match to the trained labels or an unknown class based on subsequent input of encrypted feature vectors.

In other embodiments, the system can be configured with a trained classification neural network and receive from another processing component, system, or entity, encrypted feature vectors to use for prediction with the trained classification network. According to various embodiments, system 704 can accept, create or receive original biometric information (e.g., input 702). The input 702 can include images of people, images of faces, thumbprint scans, voice recordings, sensor data, etc. Further, the voice inputs can be requested by the system, and correspond to a set of randomly selected biometric instances (including for example, randomly selected words). According to various embodiments, the inputs can be processed for identity matching and in conjunction the inputs can be analyzed to determine matching to the randomly selected biometric instances for liveness verification. As discussed above, the system 704 can also be architected to provide a prediction on input of an encrypted feature vector, and another system or component can accept unencrypted biometrics and/or generate encrypted feature vectors, and communicate the same for processing.

According to one embodiment, the system can include a biometric processing component 708. A biometric processing component (e.g., 708) can be configured to crop received images, sample voice biometrics, eliminate noise from microphone captures, etc., to focus the biometric information on distinguishable features (e.g., automatically crop image around face, eliminate background noise for voice sample, etc.). Various forms of pre-processing can be executed on the received biometrics, and the pre-processing can be executed to limit the biometric information to important features or to improve identification by eliminating noise, reducing an analyzed area, etc. In some embodiments, the pre-processing (e.g., via 708) is not executed or not available. In other embodiments, only biometrics that meet quality standards are passed on for further processing.

Processed biometrics can be used to generate additional training data, for example, to enroll a new user, and/or train a classification component/network to perform predictions. According to one embodiment, the system 704 can include a training generation component 710, configured to generate new biometrics for use in training to identify a user. For example, the training generation component 710 can be configured to create new images of the user's face or voice having different lighting, different capture angles, etc., different samples, filtered noise, introduced noise, etc., in order to build a larger training set of biometrics. In one example, the system includes a training threshold specifying how many training samples to generate from a given or received biometric. In another example, the system and/or training generation component 710 is configured to build twenty five additional images from a picture of a user's face. Other numbers of training images, or voice samples, etc., can be used. In further examples, additional voice samples can be generated from an initial set of biometric inputs to create a larger set of training samples for training a voice network (e.g., via 710)

According to one embodiment, the system is configured to generate encrypted feature vectors from the biometric input (e.g., process images from input and generated training images, process voice inputs and/or voice samples, among other options). In various embodiments, the system 704 can include an embedding component 712 configured to generate encrypted embeddings or encrypted feature vectors (e.g., image feature vectors, voice feature vectors, health data feature vectors, etc.).

According to one embodiment, component 712 executes a convolution neural network ("CNN") to process image inputs (and for example, facial images), where the CNN includes a layer which generates Euclidean measurable output. The embedding component 712 can include multiple neural networks each tailored to specific biometric inputs, and configured to generate encrypted feature vectors (e.g., for captured images, for voice inputs, for health measurements or monitoring, etc.). According to various embodiments, the system can be configured to required biometric inputs of various types, and pass the type of input to respective neural networks for processing to capture respective encrypted feature vectors, among other options. In various embodiments, one or more processing neural networks is instantiated as part of the embedding component 712, and the respective neural network process unencrypted biometric inputs to generate encrypted feature vectors.

In one example, the processing neural network is a convolutional neural network constructed to create encrypted embeddings from unencrypted biometric input. In one example, encrypted feature vectors can be extracted from a neural network at the layers preceding a softmax layer (including for example, the n-1 layer). As discussed herein, various neural networks can be used to define embeddings or features vectors with each tailored to an analyzed biometric (e.g., voice, image, health data, etc.), where an output of or with the model is Euclidean measurable. Some examples of these neural network include a model having a softmax layer. Other embodiments use a model that does not include a softmax layer to generate Euclidean measurable feature vectors. Various embodiments of the system and/or embedding component are configured to generate and capture encrypted feature vectors for the processed biometrics in the layer or layer preceding the softmax layer.

According to some embodiments, the system 704 can include a classifier component 714. The classifier component can include one or more deep neural networks trained on encrypted feature vector and label inputs for respective users and their biometric inputs. The trained neural network can then be used during prediction operations to return a match to a person (e.g., from among a groups of labels and people (one to many matching) or from a singular person (one to one matching)) or to return a match to an unknown class.

During training of the classifier component 714, the feature vectors from the embedding component 712 or system 704 are used by the classifier component 714 to bind a user to a classification (i.e., mapping biometrics to a matchable/searchable identity). According to one embodiment, a deep learning neural network (e.g., enrollment and prediction network) is executed as a fully connected neural network ("FCNN") trained on enrollment data. In one example, the FCNN generates an output identifying a person or indicating an UNKNOWN individual (e.g., at 706). Other examples can implement different neural networks for classification and return a match or unknown class accordingly. In some examples, the classifier is a neural network but does not require a fully connected neural network.

According to various embodiments, a deep learning neural network (e.g., which can be an FCNN) must differentiate between known persons and the UNKNOWN. In some examples, the deep learning neural network can include a sigmoid function in the last layer that outputs probability of class matching based on newly input biometrics or that outputs values showing failure to match. Other examples achieve matching based on executing a hinge loss function to establish a match to a label/person or an unknown class.

In further embodiments, the system 704 and/or classifier component 714 are configured to generate a probability to establish when a sufficiently close match is found. In some implementations, an unknown person is determined based on negative return values (e.g., the model is tuned to return negative values for no match found). In other embodiments, multiple matches can be developed by the classifier component 714 and voting can also be used to increase accuracy in matching.

Various implementations of the system (e.g., 704) have the capacity to use this approach for more than one set of input. In various embodiments, the approach itself is biometric agnostic. Various embodiments employ encrypted feature vectors that are Euclidean measurable, generation of which is handled using the first neural network or a respective first network tailored to a particular biometric. In some examples, different neural networks are instantiated to process different types of biometrics. Using that approach the vector generating neural network may be swapped for or use a different neural network in conjunction with others where each is capable of creating a Euclidean measurable encrypted feature vector based on the respective biometric. Similarly, the system may enroll in both or greater multiple biometric types (e.g., use two or more vector generating networks) and predict on the features vectors generated for both types of biometrics using both neural networks for processing respective biometric types, which can also be done simultaneously. In one embodiment, feature vectors from each type of biometric can likewise be processed in respective deep learning networks configured to predict matches based on the feature vector inputs (or return unknown). The co-generated results (e.g., one from each biometric type) may be used to identify a user using a voting scheme and may better perform by executing multiple predictions simultaneously.

According to another aspect, generating accurate (e.g., greater than 90% accuracy in example executions described below) identification is only a part of a complete authentication system. In various embodiments, identification is coupled with liveness testing to ensure that biometric inputs are not, for example, being recorded and replayed for verification. For example, the system 704 can include a liveness component 718. The liveness component can be configured to generate a random set of biometric instances, that the system requests a user submit. The random set of biometric instance can serve multiple purposes. For example, the biometric instances provide a biometric input that can be used for identification, and can also be used for liveness (e.g., validate matching to random selected instances). If both tests are valid, the system can provide an authentication indication or provide access or execution of a requested function. Further embodiments can require multiple types of biometric input for identification, and couple identification with liveness validation. In yet other embodiments, liveness testing can span multiple biometric inputs as well.

According to one embodiment, the liveness component 718 is configured to generate a random set of words that provide a threshold period of voice data from a user requesting authentication. In one example, the system is configured to require a five second voice signal for processing, and the system can be configured to select the random biometric instances accordingly. Other thresholds can be used (e.g., one, two, three, four, six, seven, eight, nine seconds or fractions thereof, among other examples), each having respective random selections that are associated with a threshold period of input.

According to further embodiments, the system (e.g. 704) can be configured to incorporate new identification classes responsive to receiving new biometric information. In one embodiment, the system 704 includes a retraining component configured to monitor a number of new biometrics (e.g., per user/identification class or by total number of new biometrics) and automatically trigger a re-enrollment with the new feature vectors derived from the new biometric information (e.g., produced by 712). In other embodiments, the system can be configured to trigger re-enrollment on new feature vectors based on time or time period elapsing.

The system 704 and/or retraining component 716 can be configured to store feature vectors as they are processed, and retain those feature vectors for retraining (including for example feature vectors that are unknown to retrain an unknown class in some examples). Various embodiments of the system are configured to incrementally retrain the classification model (e.g., classifier component 714 and/or a DNN) on system assigned numbers of newly received biometrics. Further, once a system set number of incremental retrainings have occurred the system is further configured to complete a full retrain of the model.

According to various aspects, the incremental retrain execution avoids the conventional approach of fully retraining an neural network to recognize new classes and generate new identifications and/or to incorporate new feature vectors as they are input. Incremental re-training of an existing model to include a new identification without requiring a full retraining provides significant execution efficiency benefits over conventional approaches.

According to various embodiments, the variables for incremental retraining and full retraining can be set on the system via an administrative function. Some defaults include incremental retrain every 3, 4, 5, 6, etc., identifications, and full retrain every 3, 4, 5, 6, 7, 8, 9, 10, etc., incremental retrains. Additionally, this requirement may be met by using calendar time, such as retraining once a year. These operations can be performed on offline (e.g., locked) copies of the model, and once complete, the offline copy can be made live.

Additionally, the system 704 and/or retraining component 716 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed and incorporated, for example, new classes without requiring fully retraining the classification model. When a new user is added, the system is and/or retraining component 716 is configured to incrementally retrain the classification model—ultimately saving significant computation time over convention retraining executions. Once the over allocation is exhausted (e.g., 100 total identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an update version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 700 can receive feature vectors instead of original biometrics and processing original biometrics can occur on different systems—in these cases system 700 may not include, for example, 708, 710, 712, and instead receive feature vectors from other systems, components or processes.

Example Liveness Execution And Considerations

According one aspect, in establishing identity and authentication an authentication system is configured to determine if the source presenting the features is, in fact, a live source. In conventional password systems, there is no check for liveliness. A typical example of a conventional approach includes a browser where the user fills in the fields for username and password or saved information is pre-filled in a form on behalf of the user. The browser is not a live feature, rather the entry of the password is pulled from the browser' form history and essentially replayed. This is an example of replay, and according to another aspect presents many challenges exist where biometric input could be copied and replayed.

The inventors have realized that biometrics have the potential to increase security and convenience simultaneously. However, there are many issues associated with such implementation, including for example, liveness. Some conventional approaches have attempted to introduce biometrics—applying the browser example above, an approach can replace authentication information with an image of a person's face or a video of the face. In such conventional systems that do not employ liveness checks, these conventional systems may be compromised by using a stored image of the face or stored video and replaying for authentication.

The inventors have realized that use of biometrics (e.g., such as face, voice or fingerprint, etc.) include the consequence of the biometric potentially being offered in non-live forms, and thus allowing a replayed biometric to be an offering of a plausible to the system. Without liveness, the plausible will likely be accepted. The inventors have further realized that to determine if a biometric is live is an increasingly difficult problem. Examined are some approaches for resolving the liveness problem—which are treated broadly as two classes of liveness approaches (e.g., liveness may be subdivided into active liveness and passive liveness problem domains). Active liveness requires the user to do something to prove the biometric is not a replica. Passive liveness makes no such requirement to the user and the system alone must prove the biometric is not a replica. Various embodiments and examples are directed to active liveness validation (e.g., random words supplied by a user), however, further examples can be applied in a passive context (e.g., system triggered video capture during input of biometric information, ambient sound validation, etc.). Table X (FIG. 8A-B) illustrates example implementation that may be employed, and includes analysis of potential issues for various interactions of the example approaches. In some embodiments, various ones of the examples in Table X can be combined to reduce inefficiencies (e.g., potential vulnerabilities) in the implementation. Although some issues are present in the various comparative embodiments, the implementation can be used, for example, where the potential for the identified replay attacks can be minimized or reduced.

According to one embodiment, randomly requested biometric instances in conjunction with identity validation on the same random biometric instances provides a high level of assurance of both identity and liveness. In one example (Row 8), the random biometric instances include a set of random words selected for liveness validation in conjunction with voice based identification.

Figure 9:
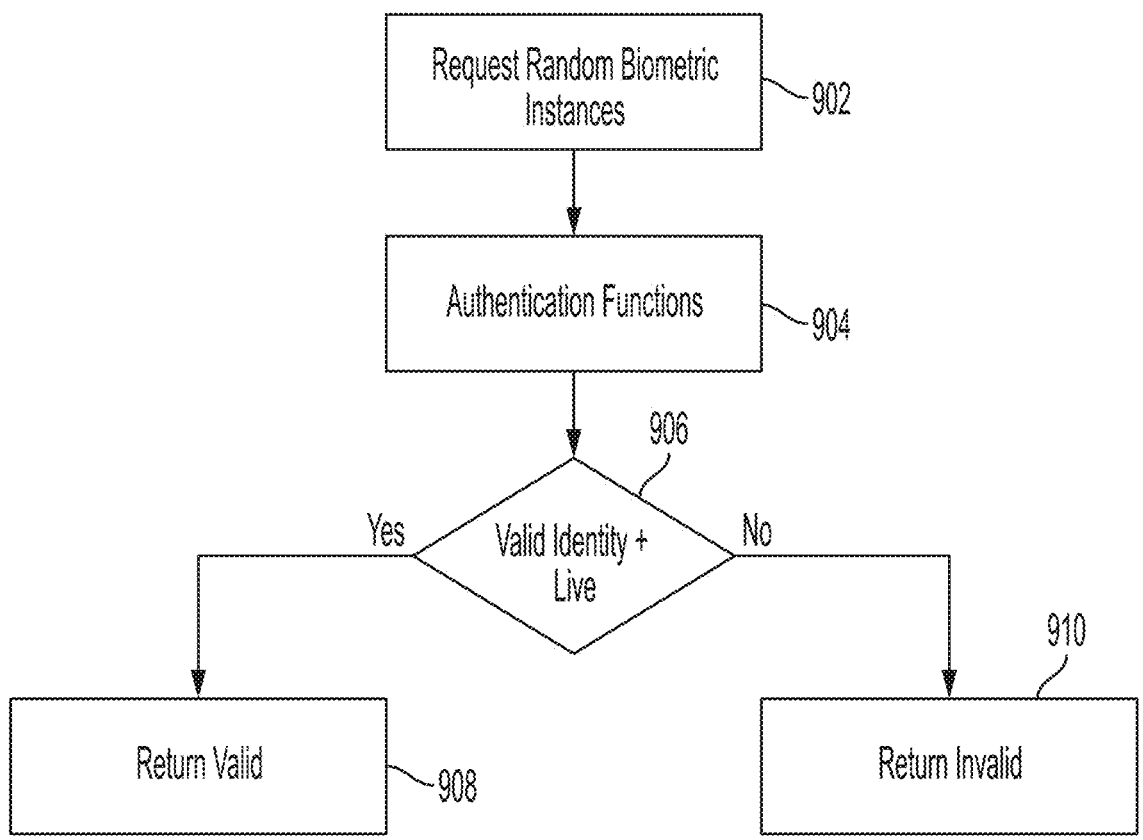
FIG. 9 is an example process for determining identity and liveness, according to one embodiment.

According to one embodiment, an authentication system, assesses liveness by asking the user to read a few random words. This can be done in various embodiments, via execution of process 900, FIG. 9. According to various embodiment, process 900 can being at 902 with a request to a user to supply a set of random biometric instances. Process 900 continues with concurrent (or, for example, simultaneous) authentication functions—identity and liveness at 904. For example, an authentication system can concurrently or simultaneously process the received voice signal through two algorithms (e.g., liveness algorithm and identity algorithm (e.g., by executing 904 of process 900), returning a result in less than one second. The first algorithm (e.g., liveness) performs a text to speech function to compare the pronounced text to the requested text (e.g., random words) to verify that the words were read correctly, and the second algorithm uses a prediction function (e.g., a prediction application programming interface (API)) to perform a one-to-many (1:N) identification on a private voice biometric to ensure that the input correctly identifies the expected person. At 908, for example, process 900 can return an authentication value for identified and live inputs 906 YES. If either check fails 906 NO, process 900 can return an invalid indicator at 910.

Further embodiments implement multiple biometric factor identification with liveness to improve security and convenience. In one example, a first factor, face (e.g., image capture), is used to establish identity. In another example, the second factor, voice (e.g., via random set of words), is used to confirm identity, and establish authentication with the further benefit of confirming (or not) that the source presenting the biometric input is live.

Various embodiments of private biometric systems are configured to execute liveness. The system generates random text that is selected to take roughly 5 seconds to speak (in whatever language the user prefers—and with other example threshold minimum periods). The user reads the text and the system (e.g., implemented as a private biometrics cloud service or component) then performs a text to speech process, comparing the pronounced text to the requested text. The system allows, for example, a private biometric component to assert the liveness of the requestor for authentication. In conjunction with liveness, the system compares the random text voice input and performs an identity assertion on the same input to ensure the voice that spoke the random words matches the user's identity. For example, input audio is now used for liveness and identity.

Figure 10:
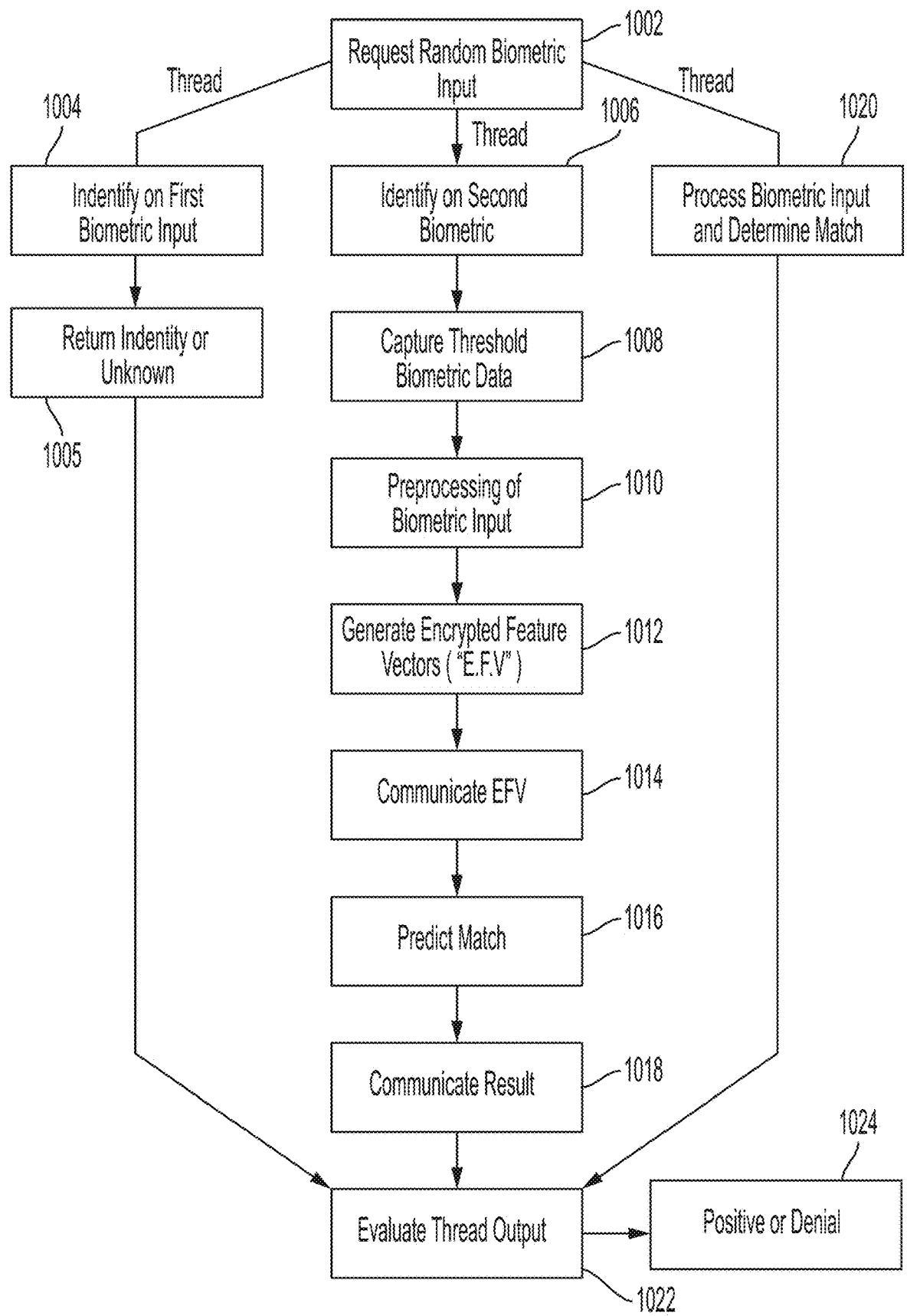
FIG. 10 is an example process for determining identity and liveness, according to one embodiment.

FIG. 10 is an example process flow 1000 for executing identification and liveness validation. Process 1000 can be executed by an authentication system (e.g., 704, FIG. 7 or 304, FIG. 3). According to one embodiment, process 1000 begins with generation of a set of random biometric instances (e.g., set of random words) and triggering a request for the set of random words at 1002. In various embodiments, process 1000 continues under multiple threads of operation. At 1004, a first biometric type can be used for a first identification of a user in a first thread (e.g., based on images captured of a user during input of the random words). Identification of the first biometric input (e.g., facial identification) can proceed as discussed herein (e.g., process unencrypted biometric input with a first neural network to output encrypted feature vectors, predict a match on the encrypted feature vectors with a DNN, and return an identification or unknown), and as described in, for example, process 200 and/or process 250 below. At 1005, an identity corresponding to the first biometric or an unknown class is returned. At 1006, a second biometric type can be used for a second identification of a user in a second thread. For example, the second identification can be based upon a voice biometric. According to one embodiment, processing of a voice biometric can continue at 1008 with capture of at least a threshold amount of the biometric (e.g., 5 second of voice). In some examples, the amount of voice data used for identification can be reduced at 1010 with biometric pre-processing. In one embodiment, voice data can be reduced with execution of pulse code modulation. Various approaches for processing voice data can be applied, including pulse code modulation, amplitude modulation, etc., to convert input voice to a common format for processing. Some example functions that can be applied (e.g., as part of 1010) include Librosa (e.g., to eliminate background sound, normalize amplitude, etc.); pydub (e.g., to convert between mp3 and .wav formats); Librosa (e.g., for phase shift function); Scipy (e.g. to increase low frequency); Librosa (e.g., for pulse code modulation); and/or soundfile (e.g., for read and write sound file operations).

In various embodiments, processed voice data is converted to the frequency domain via a fourier transform (e.g., fast fourier transform, discrete fourier transform, etc.) which can be provided by numpy or scipy libraries. Once in the frequency domain, the two dimensional frequency array can be used to generate encrypted feature vectors.

In some embodiments, voice data is input to a pre-trained neural network to generate encrypted voice feature vectors at 1012. In one example, the frequency arrays are used as input to a pre-trained convolutional neural network ("CNN") which outputs encrypted voice feature vectors. In other embodiments, different pre-trained neural networks can be used to output encrypted voice feature vectors from unencrypted voice input. As discussed throughout, the function of the pre-trained neural network is to output Euclidean measureable encrypted feature vectors upon voice data input. Once encrypted features vectors are generated at 1012, the unencrypted voice data can be deleted. Some embodiments receive encrypted feature vectors for processing rather than generate them from unencrypted voice directly, in such embodiments there is no unencrypted voice to delete.

In one example, a CNN is constructed with the goal of creating embeddings and not for its conventional purposed of classifying inputs. In further example, the CNN can employ a triple loss function (including, for example, a hard triple loss function), which enables the CNN to converge more quickly and accurately during training than some other implementations. In further examples, the CNN is trained on hundreds or thousands of voice inputs. Once trained, the CNN is configured for creation of embeddings (e.g., encrypted feature vectors). In one example, the CNN accepts a two dimensional array of frequencies as an input and provides floating point numbers (e.g., 32, 64, 128, 256, 1028, . . . floating point numbers) as output.

In some executions of process 1000, the initial voice capture and processing (e.g., request for random words-1002—1012) can be executed on a user device (e.g., a mobile phone) and the resulting encrypted voice feature vector can be communicated to a remote service via an authentication API hosted and executed on cloud resources. In some other executions, the initial processing and prediction operations can be executed on the user device as well. Various execution architectures can be provided, including fully local authentication, fully remote authentication, and hybridization of both options.

In one embodiment, process 1000 continues with communication of the voice feature vectors to a cloud service (e.g., authentication API) at 1014. The voice features vectors can then be processed by a fully connected neural network ("FCNN") for predicting a match to a trained label at 1016. As discussed, the input to the FCNN is an embedding generated by a first pre-trained neural network (e.g., an embedding comprising 32, 64, 128, 256, 1028, etc. floating point numbers). Prior to execution of process 1000, the FCNN is trained with a threshold number of people for identification (e.g., 500, 750, 1000, 1250, 1500 . . . etc.). The initial training can be referred to as "priming" the FCNN. The priming function is executed to improve accuracy of prediction operations performed by the FCNN.

At 1018, the FCNN returns a result matching a label or an unknown class—i.e., matches to an identity from among a group of candidates or does not match to a known identity. The result is communicated for evaluation of each threads' result at 1022.

According to various embodiments, the third thread of operation is executed to determine that the input biometrics used for identification are live (i.e., not spoofed, recorded, or replayed). For example, at 1020 the voice input is processed to determine if the input words matches the set of random words requested. In one embodiment, a speech recognition function is executed to determine the words input, and matching is executed against the randomly requested words to determine an accuracy of the match. If any unencrypted voice input remains in memory, the unencrypted voice data can be deleted as part of 1020. In various embodiments, processing of the third thread, can be executed locally on a device requesting authorization, on a remote server, a cloud resource, or any combination. If remote processing is executed, a recording of the voice input can be communicated to a server or cloud resource as part of 1020, and the accuracy of the match (e.g., input to random words) determined remotely. Any unencrypted voice data can be deleted once encrypted feature vectors are generated and/or once matching accuracy is determined.

In further embodiments, the results of each thread is joined to yield an authorization or invalidation. At 1024, the first thread returns an identity or unknown for the first biometric, the second thread returns an identity or unknown for the second biometric, and the third thread an accuracy of match between a random set of biometric instances and input biometric instances. At 1024, process 1000 provides a positive authentication indication wherein first thread identity matches the second thread identity and one of the biometric inputs is determined to be live (e.g., above a threshold accuracy (e.g., 33% or greater among other options). If not positive, process 1000 can be re-executed (e.g., a threshold number of times) or a denial can be communicated.

According to various embodiments, process 1000 can include concurrent and/or simultaneous execution of the authentication threads to return a positive authentication or a denial. In further embodiments, process 1000 can be reduced to a single biometric type such that one identification thread and one liveness thread is executed to return a positive authentication or a denial. In further embodiments, the various steps described can be executed together or in different order, and may invoke other processes (e.g., to generate encrypted feature vectors to process for prediction) as part of determining identity and liveness of biometric input. In yet other embodiments, additional biometric types can be tested to confirm identity, with at least one liveness test on one of the biometric inputs to provide assurance that submitted biometrics are not replayed or spoofed. In further example, multiple biometrics types can be used for identity and multiple biometric types can be used for liveness validation.

Example Authentication System With Liveness

In some embodiments, an authentication system interacts with any application or system needing authentication service (e.g., a Private Biometrics Web Service). According to one embodiment, the system uses private voice biometrics to identify individuals in a datastore (and provides one to many (1:N) identification) using any language in one second. Various neural networks measure the signals inside of a voice sample with high accuracy and thus allow private biometrics to replace "username" (or other authentication schemes) and become the primary authentication vehicle.

In some examples, the system employs face (e.g., images of the user's face) as the first biometric and voice as the second biometric type, providing for at least two factor authentication ("2FA"). In various implementation, the system employs voice for identity and liveness as the voice biometric can be captured with the capture of a face biometric. Similar biometric pairings can be executed to provide a first biometric identification, a second biometric identification for confirmation, coupled with a liveness validation.

In some embodiments, an individual wishing to authenticate is asked to read a few words while looking into a camera and the system is configured to collect the face biometric and voice biometric while the user is speaking. According to various examples, the same audio that created the voice biometric is used (along with the text the user was requested to read) to check liveness and to ensure the identity of the user's voice matches the face.

Such authentication can be configured to augment security in a wide range of environments. For example, private biometrics (e.g., voice, face, health measurements, etc.) can be used for common identity applications (e.g., "who is on the phone?") and single factor authentication (1FA) by call centers, phone, watch and TV apps, physical security devices (door locks), and other situations where a camera is unavailable. Additionally, where additional biometrics can be captured 2FA or better can provide greater assurance of identity with the liveness validation.

Broadly stated, various aspects implement similar approaches for privacy-preserving encryption for processed biometrics (including, for example, face and voice biometrics). Generally stated, after collecting an unencrypted biometric (e.g., voice biometric), the system creates a private biometric (e.g., encrypted feature vectors) and then discards the original unencrypted biometric template. As discussed herein, these private biometrics enable an authentication system and/or process to identify a person (i.e., authenticate a person) while still guaranteeing individual privacy and fundamental human rights by only operating on biometric data in the encrypted space.

To transform the unencrypted voice biometric into a private biometric, various embodiments are configured to pre-process the voice signal and reduce it to the voice data a smaller form (e.g., for example, without any loss). The Nyquist sampling rate for this example is two times the frequency of the signal. In various implementations, the system is configured to sample the resulting data and use this sample as input to a Fourier transform. In one example, the resulting frequencies are used as input to a pre-trained voice neural network capable of returning a set of embeddings (e.g., encrypted voice feature vectors). These embeddings, for example, sixty four floating point numbers, provide the system with private biometrics which then serve as input to a second neural network for classification.

Private Biometric Implementation

Various embodiments are discussed below for enrolling users with private biometrics and prediction on the same. Various embodiment discuss some considerations and examples for implementation of private biometrics. These examples and embodiments can be used with liveness verification of the respective private biometrics as discussed above.

FIG. 1 is an example process flow 100 for enrolling in a privacy-enabled biometric system (e.g., FIG. 3, 304 described in greater detail below or FIG. 7, 704 above). Process 100 begins with acquisition of unencrypted biometric data at 102. The unencrypted biometric data (e.g., plaintext, reference biometric, etc.) can be directly captured on a user device, received from an acquisition device, or communicated from stored biometric information. In one example, a user takes a photo of themselves on their mobile device for enrollment. Pre-processing steps can be executed on the biometric information at 104. For example, given a photo of a user, pre-processing can include cropping the image to significant portions (e.g., around the face or facial features). Various examples exist of photo processing options that can take a reference image and identify facial areas automatically.

In another example, the end user can be provided a user interface that displays a reference area, and the user is instructed to position their face from an existing image into the designated area. Alternatively, when the user takes a photo the identified area can direct the user to focus on their face so that it appears within the highlight area. In other options, the system can analyze other types of images to identify areas of interest (e.g., iris scans, hand images, fingerprint, etc.) and crop images accordingly. In yet other options, samples of voice recordings can be used to select data of the highest quality (e.g., lowest background noise), or can be processed to eliminate interference from the acquired biometric (e.g., filter out background noise).

Having a given biometric, the process 100 continues with generation of additional training biometrics at 106. For example, a number of additional images can be generated from an acquired facial image. In one example, an additional twenty five images are created to form a training set of images. In some examples, as few as three images can be used but with the tradeoff of reduce accuracy. In other examples, as many as forty training images may be created. The training set is used to provide for variation of the initial biometric information, and the specific number of additional training points can be tailored to a desired accuracy (see e.g., Tables I-VIII below provide example implementation and test results). Various ranges of training set production can be used in different embodiments (e.g., any set of images from two to one thousand). For an image set, the training group can include images of different lighting, capture angle, positioning, etc. For audio based biometrics different background noises can be introduced, different words can be used, different samples from the same vocal biometric can be used in the training set, among other options. Various embodiments of the system are configured to handle multiple different biometric inputs including even health profiles that are based at least in part on health readings from health sensors (e.g., heart rate, blood pressure, EEG signals, body mass scans, genome, etc.). According to various embodiments, biometric information includes Initial Biometric Values (IBV) a set of plaintext values (pictures, voice, SSNO, driver's license number, etc.) that together define a person.

At 108, feature vectors are generated from the initial biometric information (e.g., one or more plain text values that identify an individual). Feature vectors are generated based on all available biometric information which can include a set of and training biometrics generated from the initial unencrypted biometric information received on an individual or individuals. According to one embodiment, the IBV is used in enrollment and for example in process 100. The set of IBVs are processed into a set of initial biometric vectors (e.g., feature vectors) which are used downstream in a subsequent neural network.

In one implementation, users are directed to a website to input multiple data points for biometric information (e.g., multiple pictures including facial images) in conjunction with personally identifiable information ("PII"). The system and/or execution of process 100 can include tying the PII to encryptions of the biometric as discussed below.

In one embodiment, a convolutional deep neural network is executed to process the unencrypted biometric information and transform it into feature vector which has a property of being one-way encrypted cipher text. The neural network is applied (108) to compute a one-way homomorphic encryption of the biometric—resulting in feature vectors (e.g., at 110). These outputs can be computed from an original biometric using the neural network but the values are one way in that the neural network cannot then be used to regenerate the original biometrics from the outputs.

Various embodiments take as input a neural network capable of taking plaintext input and returning Euclidean measurable output. One such implementation is FaceNet which takes in any image of a face and returns 128 floating point numbers, as the feature vector. The neural network is fairly open ended, where various implementations are configured to return a Euclidean measureable feature vector that maps to the input. This feature vector is nearly impossible to use recreate the original input biometric and is therefore considered a one-way encryption.

Various embodiments are configured to accept the feature vector(s) produced by a first neural network and use it as input to a new neural network (e.g., a second classifying neural network). According to one example, the new neural network has additional properties. This neural network is specially configured to enable incremental training (e.g., on new users and/or new feature vectors) and configured to distinguish between a known person and an unknown person. In one example, a fully connected neural network with 2 hidden layers and a "hinge" loss function is used to process input feature vectors and return a known person identifier (e.g., person label or class) or indicate that the processed biometric feature vectors are not mapped to a known person. For example, the hinge loss function outputs one or more negative values if the feature vector is unknown. In other examples, the output of the second neural network is an array of values, wherein the values and their positions in the array determined a match to a person.

Various embodiment use different machine learning models for capturing feature vectors in the first network. According to various embodiments, the feature vector capture is accomplished via a pre-trained neural network (including, for example, a convolutional neural network) where the output is Euclidean measurable. In some examples, this can include models having a softmax layer as part of the model, and capture of feature vectors can occur preceding such layers. Feature vectors can be extracted from the pre-trained neural network by capturing results from the layers that are Euclidean measurable. In some examples, the softmax layer or categorical distribution layer is the final layer of the model, and feature vectors can be extracted from the n-1 layer (e.g., the immediately preceding layer). In other examples, the feature vectors can be extracted from the model in layers preceding the last layer. Some implementations may offer the feature vector as the last layer.

The resulting feature vectors are bound to a specific user classification at 112. For example, deep learning is executed at 112 on the feature vectors based on a fully connected neural network (e.g., a second neural network). The execution is run against all the biometric data (i.e., feature vectors from the initial biometric and training biometric data) to create the classification information. According to one example, a fully connected neural network having two hidden layers is employed for classification of the biometric data. In another example, a fully connected network with no hidden layers can be used for the classification. However, the use of the fully connected network with two hidden generated better accuracy in classification (see e.g., Tables I-VIII described in greater detail below). According to one embodiment, process 100 can be executed to receive an original biometric (e.g., at 102) generate feature vectors (e.g., 110), and apply a FCNN classifier to generate a label to identify a person at 112 (e.g., output #people).

Process 100 continues with discarding any unencrypted biometric data at 114. In one example, an application on the user's phone is configured to enable enrollment of captured biometric information and configured to delete the original biometric information once processed (e.g., at 114). In other embodiments, a server system can process received biometric information and delete the original biometric information once processed. According to some aspects, only requiring that original biometric information exists for a short period during processing or enrollment significantly improves the security of the system over conventional approaches. For example, systems that persistently store or employ original biometric data become a source of vulnerability. Unlike a password that can be reset, a compromised biometric remains compromised, virtually forever.

Returning to process 100, at 116 the resulting cipher text (e.g., feature vectors) biometric can be stored. In one example, the encrypted biometric can be stored locally on a user device. In other examples, the generated encrypted biometric can be stored on a server, in the cloud, a dedicated data store, or any combination thereof. In one example, the biometrics and classification is stored for use in subsequent matching or searching. For instance, new biometric information can be processed to determine if the new biometric information matches any classifications. The match (depending on a probability threshold) can then be used for authentication or validation.

In cases where a single match is executed, the neural network model employed at 112 can be optimized for one to one matching. For example, the neural network can be trained on the individual expected to use a mobile phone (assuming no other authorized individuals for the device). In some example, the neural network model can include training allocation to accommodate incremental training of the model on acquired feature vectors over time. Various embodiment, discussed in great detail below incorporate incremental training operations for the neural network to permit additional people and to incorporate newly acquired feature vectors.

In other embodiments, an optimized neural network model (e.g., FCNN) can be used for a primary user of a device, for example, stored locally, and remote authentication can use a data store and one to many models (e.g., if the first model returns unknown). Other embodiments may provide the one to many models locally as well. In some instances, the authentication scenario (e.g., primary user or not) can be used by the system to dynamically select a neural network model for matching, and thereby provide additional options for processing efficiency.

Figure 2A:
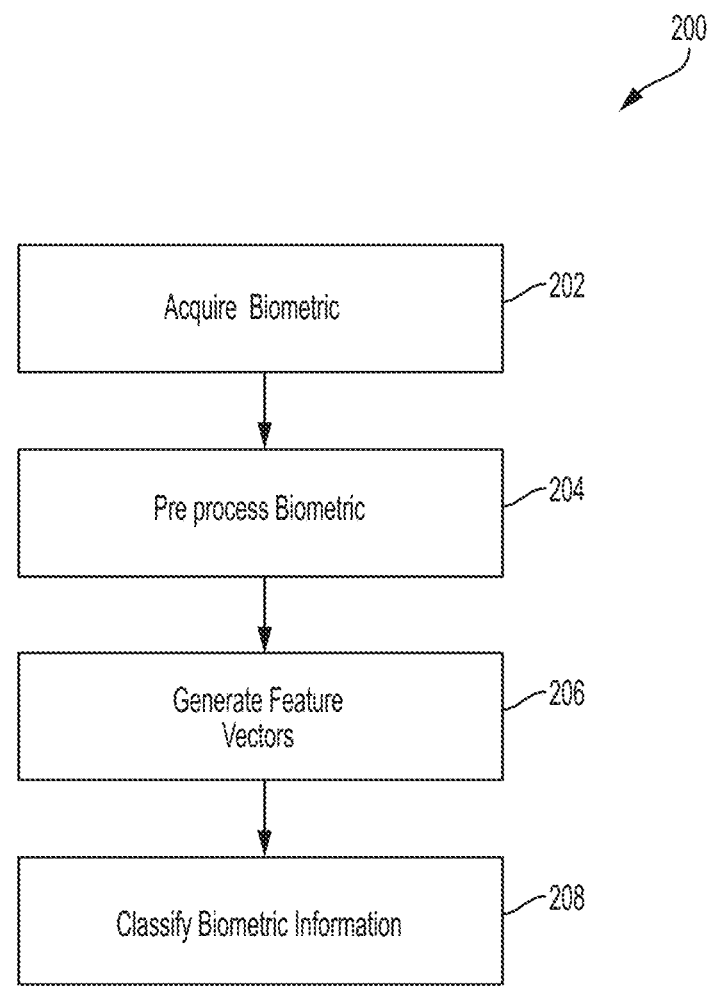
FIG. 2A is an example process flow for authentication with secured biometric data, according to one embodiment.

FIG. 2A illustrates an example process 200 for authentication with secured biometric data. Process 200 begins with acquisition of multiple unencrypted biometrics for analysis at 202. In one example, the privacy-enabled biometric system is configured to require at least three biometric identifiers (e.g., as plaintext data, reference biometric, or similar identifiers). If for example, an authentication session is initiated, the process can be executed so that it only continues to the subsequent steps if a sufficient number of biometric samples are taken, given, and/or acquired. The number of required biometric samples can vary, and take place with as few as one.

Similar to process 100, the acquired biometrics can be pre-processed at 204 (e.g., images cropped to facial features, voice sampled, iris scans cropped to relevant portions, etc.). Once pre-processing is executed the biometric information is transformed into a one-way homomorphic encryption of the biometric information to acquire the feature vectors for the biometrics under analysis (e.g., at 206). Similar to process 100, the feature vectors can be acquired using any pre-trained neural network that outputs Euclidean measurable feature vectors. In one example, this includes a pre-trained neural network that incorporates a softmax layer. However, other examples do not require the pre-trained neural network to include a softmax layer, only that they output Euclidean measurable feature vectors. In one, example, the feature vectors can be obtain in the layer preceding the softmax layer as part of step 206.

Figure 4B:
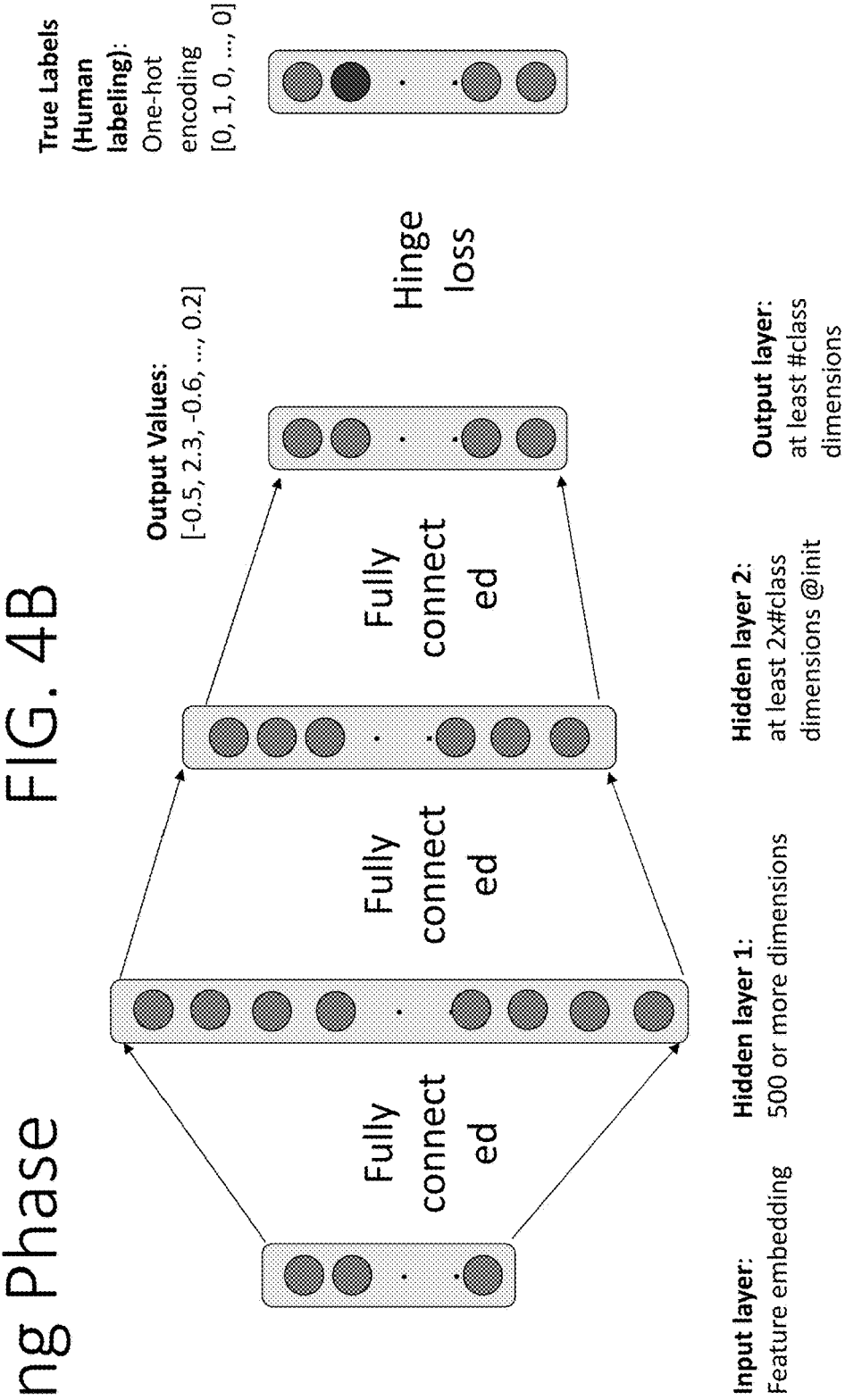
Figure 4C:
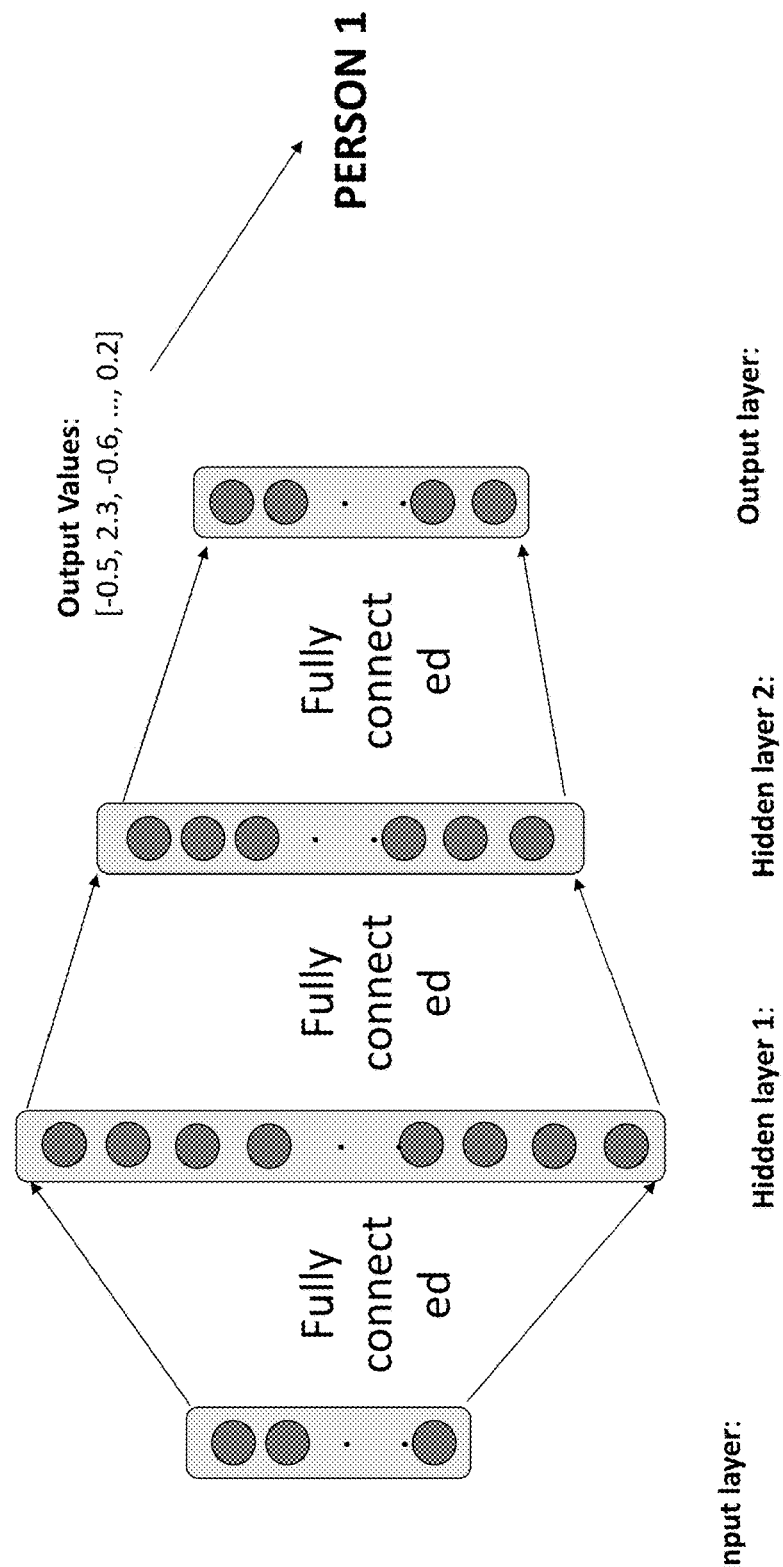
Figure 4D:
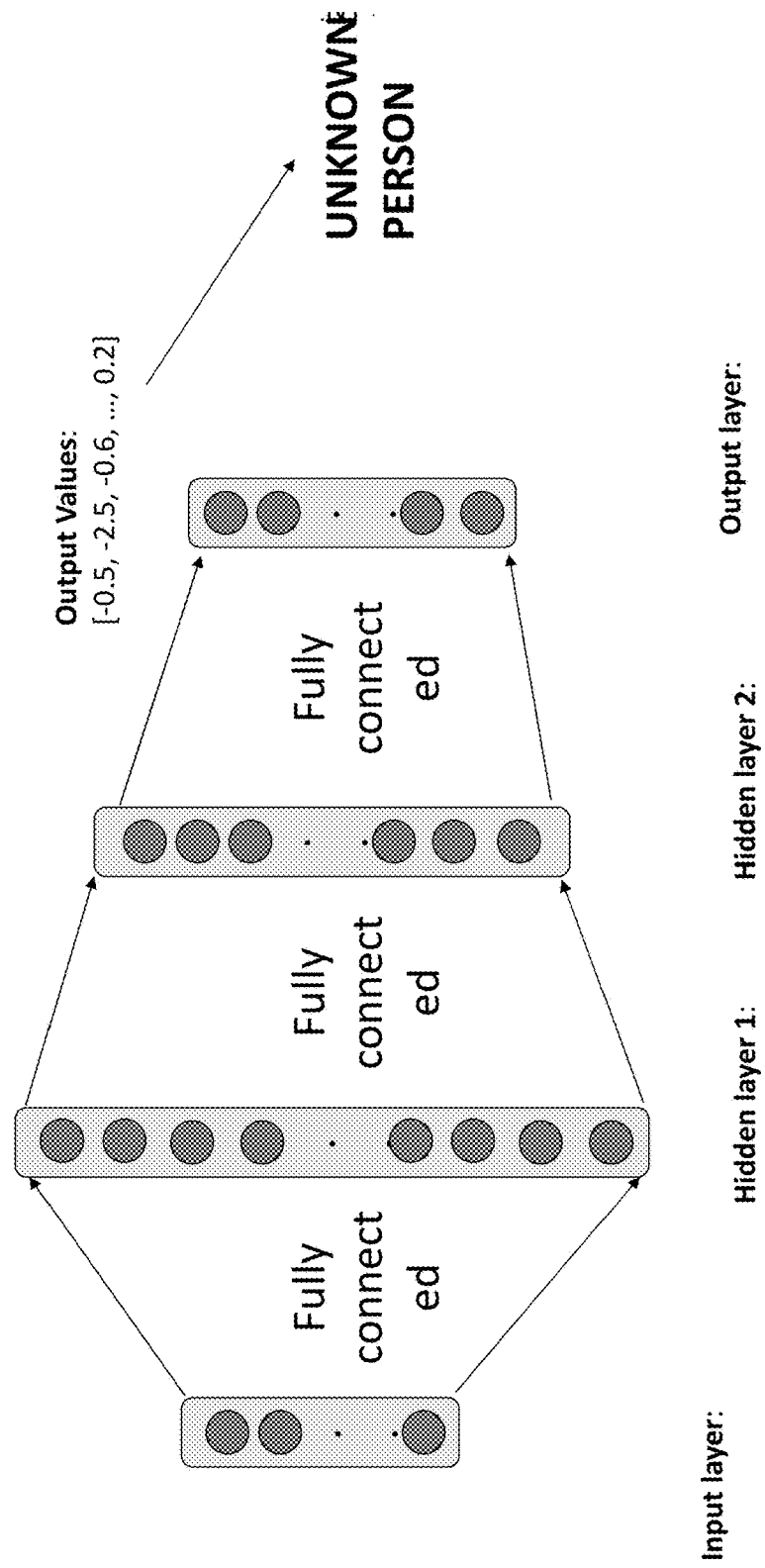
Figure 5A:
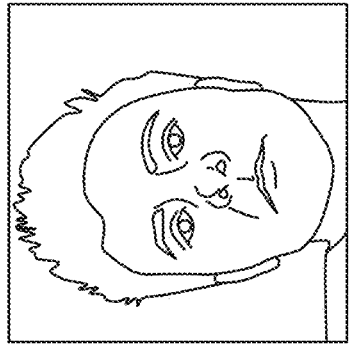
Figure 5D:
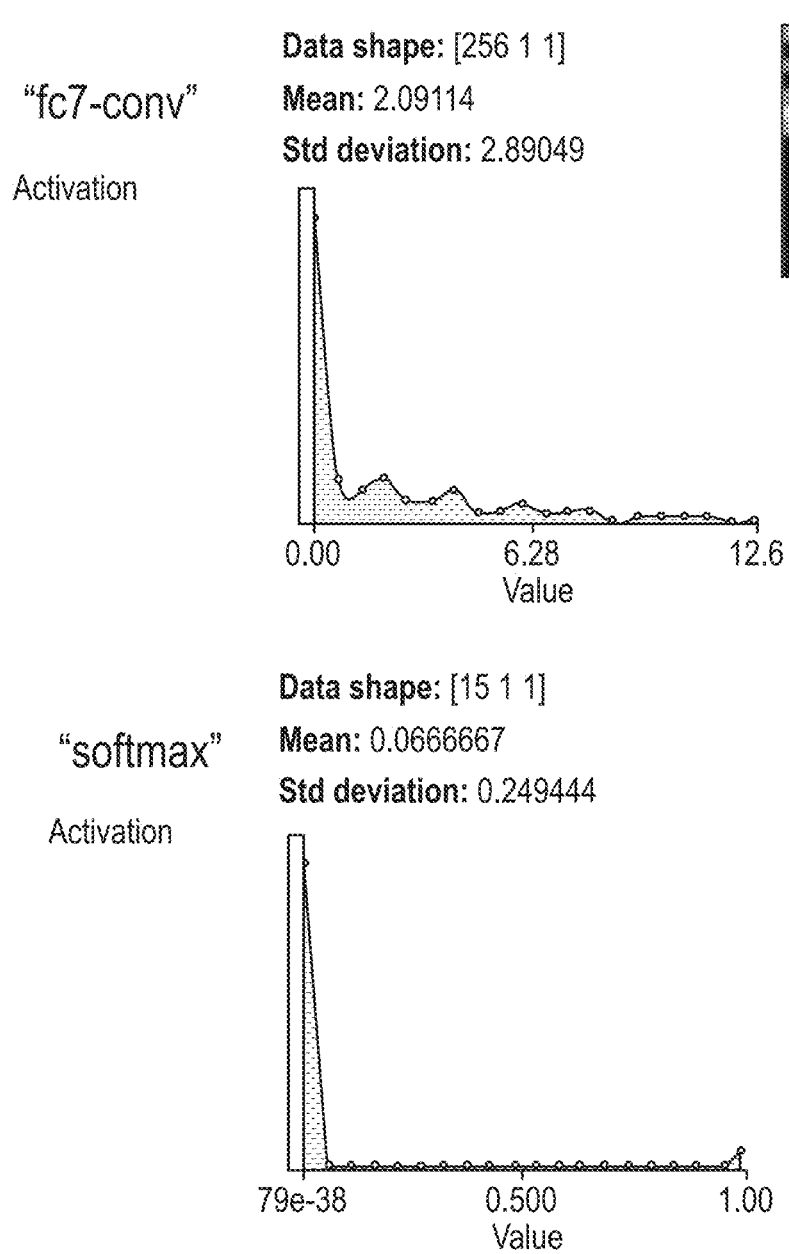
Figure 6:
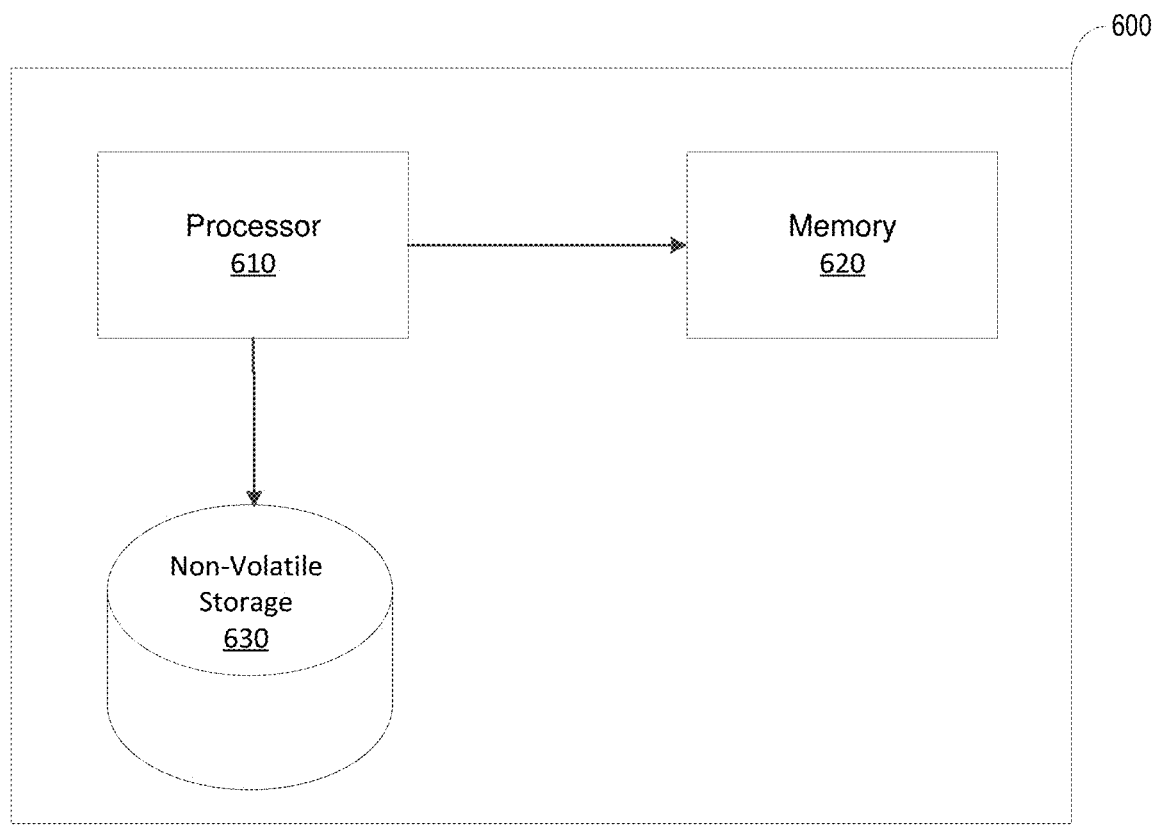
FIG. 6 is a block diagram of an embodiment of a special purpose computer system program to execute the processes and/or functions described herein.

At 208, a prediction (e.g., a via deep learning neural network) is executed to determine if there is a match for the person associated with the analyzed biometrics. As discussed above with respect to process 100, the prediction can be executed as a fully connected neural network having two hidden layers (during enrollment the neural network is configured to identify input feature vectors as individuals or unknown, and unknowns individuals can be added via incremental training or full retraining of the model). In other examples, a fully connected neural network having no hidden layers can be used. Examples of neural networks are described in greater detail below (e.g., FIG. 4 illustrates an example neural network 400). Other embodiments of the neural network can be used in process 200. According to some embodiments, the neural network features include operates as a classifier during enrollment to map feature vectors to identifications; operates as a predictor to identify a known person or an unknown. In some embodiments, different neural networks can be tailored to different types of biometrics, and facial images processed by one, while voice biometrics are processed by another.

According to some embodiments, process 208 is described agnostic to submitter security. In other words, process 200 relies on front end application configuration to ensure submitted biometrics are captured from the person trying to authenticate. As process 200 is agnostic to submitter security, the process can be executed in local and remote settings in the same manner. However, according to some implementations the execution relies on the native application or additional functionality in an application to ensure an acquired biometric represents the user to be authenticated or matched.

Figure 2B:
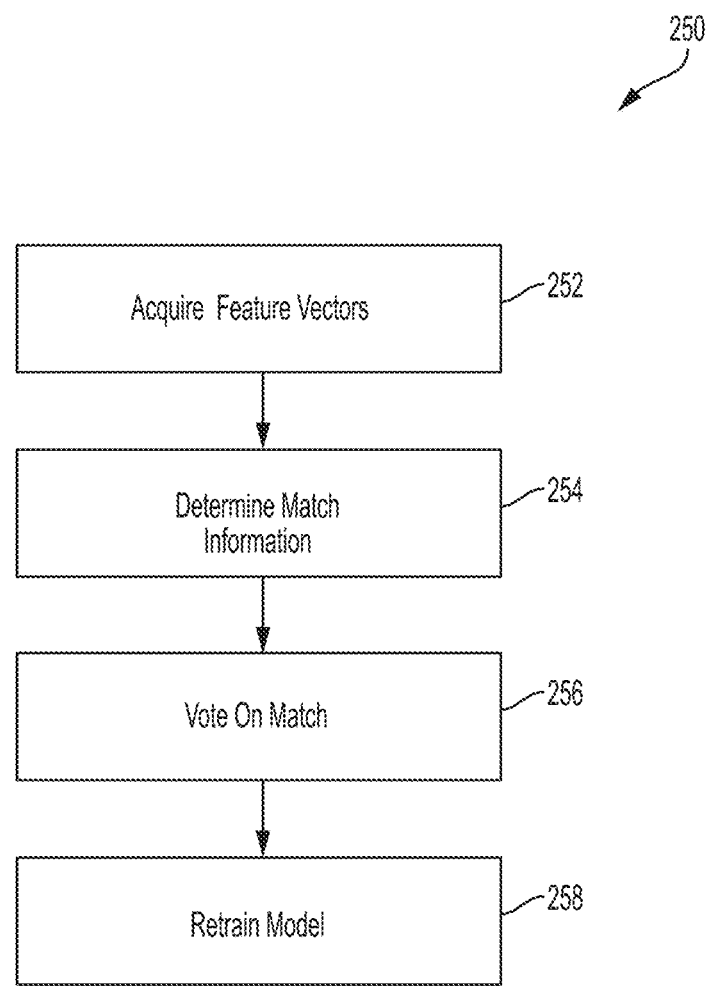
FIG. 2B is an example process flow for one to many matching execution, according to one embodiment.

FIG. 2B illustrates an example process flow 250 showing additional details for a one to many matching execution (also referred to as prediction). According to one embodiment, process 250 begins with acquisition of feature vectors (e.g., step 206 of FIG. 2A or 110 of FIG. 1). At 254, the acquired feature vectors are matched against existing classifications via a deep learning neural network. In one example, the deep learning neural network has been trained during enrollment on s set of individuals. The acquired feature vectors will be processed by the trained deep learning network to predict if the input is a match to known individual or does not match and returns unknown. In one example, the deep learning network is a fully connected neural network ("FCNN"). In other embodiments, different network models are used for the second neural network.

According to one embodiment, the FCNN outputs an array of values. These values, based on their position and the value itself, determine the label or unknown. According to one embodiment, returned from a one to many case are a series of probabilities associated with the match—assuming five people in the trained data: the output layer showing probability of match by person: [0.1, 0.9, 0.3, 0.2, 0.1] yields a match on Person 2 based on a threshold set for the classifier (e.g., >0.5). In another run, the output layer: [0.1, 0.6, 0.3, 0.8, 0.1] yields a match on Person 2 & Person 4 (e.g., using the same threshold).

However, where two results exceed the match threshold, the process and or system is configured to select the maximum value and yield a (probabilistic) match Person 4. In another example, the output layer: [0.1, 0.2, 0.3, 0.2, 0.1] shown no match to a known person—hence an UNKNOWN person—as no values exceed the threshold. Interestingly, this may result in adding the person into the list of authorized people (e.g., via enrollment discussed above), or this may result in the person being denied access or privileges on an application. According to various embodiments, process 250 is executed to determine if the person is known or not. The functions that result can be dictates by the application that requests identification of an analyzed biometrics.

For an UNKNOWN person, i.e. a person never trained to the deep learning enrollment and prediction neural network, an output layer of an UNKNOWN person looks like [−0.7, −1.7, −6.0, −4.3]. In this case, the hinge loss function has guaranteed that the vector output is all negative. This is the case of an UNKNOWN person. In various embodiments, the deep learning neural network must have the capability to determine if a person is UNKNOWN. Other solutions that appear viable, for example, support vector machine ("SVM") solutions break when considering the UNKNOWN case. According to various embodiments, the deep learning neural network (e.g., an enrollment & prediction neural network) is configured to train and predict in polynomial time.

Step 256 can be executed to vote on matching. According to one embodiment, multiple images or biometrics are processed to identify a match. In an example where three images are processed the FCNN is configured to generate an identification on each and use each match as a vote for an individual's identification. Once a majority is reached (e.g., at least two votes for person A) the system returns as output identification of person A. In other instance, for example, where there is a possibility that an unknown person may result—voting can be used to facilitate determination of the match or no match. In one example, each result that exceeds the threshold probability can count as one vote, and the final tally of votes (e.g., often 4 out of 5) is used to establish the match. In some implementations, an unknown class may be trained in the model—in the examples above a sixth number would appear with a probability of matching the unknown model. In other embodiments, the unknown class is not used, and matching is made or not against known persons. Where a sufficient match does not result, the submitted biometric information is unknown.

Responsive to matching on newly acquired biometric information, process 250 can include an optional step 258 for retraining of the classification model. In one example, a threshold is set such that step 258 tests if a threshold match has been exceed, and if yes, the deep learning neural network (e.g., classifier & prediction network) is retrained to include the new feature vectors being analyzed. According to some embodiments, retraining to include newer feature vectors permits biometrics that change over time (e.g., weight loss, weight gain, aging or other events that alter biometric information, haircuts, among other options).

Figure 3:
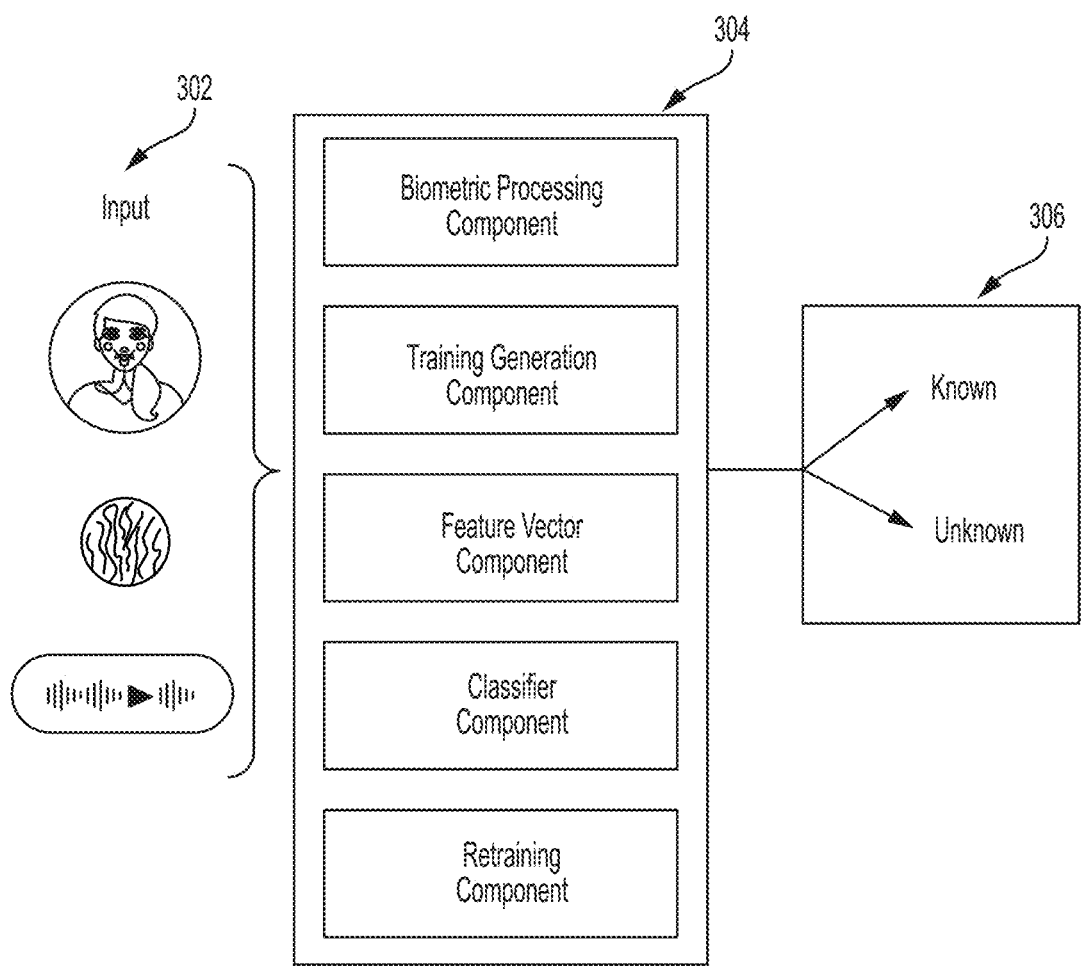
FIG. 3 is a block diagram of an embodiment of a privacy-enabled biometric system, according to one embodiment.

FIG. 3 is a block diagram of an example privacy-enabled biometric system 304. According to some embodiments, the system can be installed on a mobile device or called from a mobile device (e.g., on a remote server or cloud based resource) to return an authenticated or not signal. In various embodiments system 304 can executed any of the preceding processes. For example, system 304 can enroll users (e.g., via process 100), identify enrolled users (e.g., process 200), and search for matches to users (e.g., process 250).

According to various embodiments, system 304 can accept, create or receive original biometric information (e.g., input 302). The input 302 can include images of people, images of faces, thumbprint scans, voice recordings, sensor data, etc. A biometric processing component (e.g., 308) can be configured to crop received images, sample voice biometrics, etc., to focus the biometric information on distinguishable features (e.g., automatically crop image around face). Various forms of pre-processing can be executed on the received biometrics, designed to limit the biometric information to important features. In some embodiments, the pre-processing (e.g., via 308) is not executed or available. In other embodiments, only biometrics that meet quality standards are passed on for further processing.

Processed biometrics can be used to generate additional training data, for example, to enroll a new user. A training generation component 310 can be configured to generate new biometrics for a user. For example, the training generation component can be configured to create new images of the users face having different lighting, different capture angles, etc., in order to build a train set of biometrics. In one example, the system includes a training threshold specifying how many training samples to generate from a given or received biometric. In another example, the system and/or training generation component 310 is configured to build twenty five additional images from a picture of a user's face. Other numbers of training images, or voice samples, etc., can be used.

The system is configured to generate feature vectors from the biometrics (e.g., process images from input and generated training images). In some examples, the system 304 can include a feature vector component 312 configured to generate the feature vectors. According to one embodiment, component 312 executes a convolution neural network ("CNN"), where the CNN includes a layer which generates Euclidean measurable output. The feature vector component 312 is configured to extract the feature vectors from the layers preceding the softmax layer (including for example, the n-1 layer). As discussed above, various neural networks can be used to define features vectors tailored to an analyzed biometric (e.g., voice, image, health data, etc.), where an output of or with the model is Euclidean measurable. Some examples of these neural network include model having a softmax layer. Other embodiment, use a model that does not include a softmax layer to generate Euclidean measurable vectors. Various embodiment of the system and/or feature vector component are configured to generate and capture feature vectors for the processed biometrics in the layer or layer preceding the softmax layer.

According to another embodiment, the feature vectors from the feature vector component 312 or system 304 are used by the classifier component 314 to bind a user to a classification (i.e., mapping biometrics to an match able/searchable identity). According to one embodiment, the deep learning neural network (e.g., enrollment and prediction network) is executed as a FCNN trained on enrollment data. In one example, the FCNN generates an output identifying a person or indicating an UNKNOWN individual (e.g., at 306). Other examples, use not fully connected neural networks.

According to various embodiments, the deep learning neural network (e.g., which can be an FCNN) must differentiate between known persons and the UNKNOWN. In some examples, this can be implement as a sigmoid function in the last layer that outputs probability of class matching based on newly input biometrics or showing failure to match. Other examples achieve matching based on a hinge loss functions.

In further embodiments, the system 304 and/or classifier component 314 are configured to generate a probability to establish when a sufficiently close match is found. In some implementations, an unknown person is determined based on negative return values. In other embodiments, multiple matches can be developed and voting can also be used to increase accuracy in matching.

Various implementations of the system have the capacity to use this approach for more than one set of input. The approach itself is biometric agnostic. Various embodiments employ feature vectors that are Euclidean measurable, which is handled using the first neural network. In some instances, different neural networks are configured to process different types of biometrics. Using that approach the vector generating neural network may be swapped for or use a different neural network in conjunction with others where each is capable of creating a Euclidean measurable feature vector based on the respective biometric. Similarly, the system may enroll in both biometric types (e.g., use two or more vector generating networks) and predict on the features vectors generated for both types of biometrics using both neural networks for processing respective biometric type simultaneously. In one embodiment, feature vectors from each type of biometric can likewise be processed in respective deep learning networks configured to predict matches based on feature vector inputs or return unknown. The simultaneous results (e.g., one from each biometric type) may be used to identify using a voting scheme or may better perform by firing both predictions simultaneously According to further embodiments, the system can be configured to incorporate new identification classes responsive to receiving new biometric information. In one embodiment, the system 304 includes a retraining component configured to monitor a number of new biometrics (e.g., per user/identification class or by total number of new biometrics) and automatically trigger a re-enrollment with the new feature vectors derived from the new biometric information (e.g., produced by 312). In other embodiments, the system can be configured to trigger re-enrollment on new feature vectors based on time or time period elapsing.

The system 304 and/or retraining component 316 can be configured to store feature vectors as they are processed, and retain those feature vectors for retraining (including for example feature vectors that are unknown to retrain an unknown class in some examples). Various embodiments of the system are configured to incrementally retrain the model on system assigned numbers of newly received biometrics. Further, once a system set number of incremental retraining have occurred the system is further configured to complete a full retrain of the model. The variables for incremental retraining and full retraining can be set on the system via an administrative function. Some defaults include incremental retrain every 3, 4, 5, 6 identifications, and full retrain every 3, 4, 5, 6, 7, 8, 9, 10 incremental retrains. Additionally, this requirement may be met by using calendar time, such as retraining once a year. These operations can performed on offline (e.g., locked) copies of the model, and once complete the offline copy can be made live.

Additionally, the system 304 and/or retraining component 316 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed on the classification model. When a new user is added, the system is and/or retraining component 316 is configured to incrementally retrain the classification model—ultimately saving significant computation time over convention retraining executions. Once the over allocation is exhausted (e.g., 100 total identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an update version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 300 can receive feature vectors instead of original biometrics and processing original biometrics can occur on different systems—in these cases system 300 may not include, for example, 308, 310, 312, and instead receive feature vectors from other systems, components or processes.

FIGS. 4A-D illustrate example embodiments of a classifier network. The embodiments show a fully connected neural network for classifying feature vectors for training and for prediction. Other embodiments implement different neural networks, including for example, neural networks that are not fully connected. Each of the networks accepts Euclidean measurable feature vectors and returns a label or unknown result for prediction or binds the feature vectors to a label during training.

FIGS. 5A-D illustrate examples of processing that can be performed on input biometrics (e.g., facial image) using a neural network. Feature vectors can be extracted from such neural networks and used by a classifier (e.g., FIGS. 4A-D) during training or prediction operations. According to various embodiments, the system implements a first pre-trained neural network for generating Euclidean measurable feature vectors that are used as inputs for a second classification neural network. In other embodiments, other neural networks are used to process biometrics in the first instance. In still other examples, multiple neural networks can be used to generated Euclidean measurable feature vectors from unencrypted biometric inputs each may feed the feature vectors to a respective classifier. In some examples, each generator neural network can be tailored to a respective classifier neural network, where each pair (or multiples of each) is configured to process a biometric data type (e.g., facial image, iris images, voice, health data, etc.).

Implementation Examples

The following example instantiations are provided to illustrates various aspects of privacy-enabled biometric systems and processes. The examples are provide to illustrate various implementation details and provide illustration of execution options as well as efficiency metrics. Any of the details discussed in the examples can be used in conjunction with various embodiments.

It is realized that conventional biometric solutions have security vulnerability and efficiency/scalability issues. Apple, Samsung, Google and MasterCard have each launched biometric security solutions that share at least three technical limitations. These solutions are (1) unable to search biometrics in polynomial time; (2) do not one-way encrypt the reference biometric; and (3) require significant computing resources for confidentiality and matching.

Modern biometric security solutions are unable to scale (e.g. Apple Face ID™ authenticates only one user) as they are unable to search biometrics in polynomial time. In fact, the current "exhaustive search" technique requires significant computing resources to perform a linear scan of an entire biometric datastore to successfully one-to-one record match each reference biometric and each new input record—this is as a result of inherent variations in the biometric instances of a single individual.

Similarly, conventional solutions are unable to one-way encrypt the reference biometric because exhaustive search (as described above) requires a decryption key and a decryption to plaintext in the application layer for every attempted match. This limitation results in an unacceptable risk in privacy (anyone can view a biometric) and authentication (anyone can use the stolen biometric). And, once compromised, a biometric—unlike a password—cannot be reset.

Finally, moderns solutions require the biometric to return to plaintext in order to match since the encrypted form is not Euclidean measurable. It is possible to choose to make a biometric two-way encrypted and return to plaintext—but this requires extensive key management and, since a two-way encrypted biometric is not Euclidean measurable, it also returns the solution to linear scan limitations.

Various embodiments of the privacy-enabled biometric system and/or methods provide enhancement over conventional implementation (e.g., in security, scalability, and/or management functions). Various embodiments enable scalability (e.g., via "encrypted search") and fully encrypt the reference biometric (e.g., "encrypted match"). The system is configure to provide an "identity" that is no longer tied independently to each application and a further enables a single, global "Identity Trust Store" that can service any identity request for any application.

Various operations are enabled by various embodiment, and the functions include. For example:

Encrypted Match: using the techniques described herein, a deep neural network ("DNN") is used to process a reference biometric to compute a one-way, homomorphic encryption of the biometric's feature vector before transmitting or storing any data. This allows for computations and comparisons on cipher texts without decryption, and ensures that only the Euclidean measureable, homomorphic encrypted biometric is available to execute subsequent matches in the encrypted space. The plaintext data can then be discarded and the resultant homomorphic encryption is then transmitted and stored in a datastore. This example allows for computations and comparisons on cipher texts without decryption and ensures that only the Euclidean measureable, homomorphic encrypted biometric is available to execute subsequent matches in the encrypted space.

Encrypted Search: using the techniques described herein, encrypted search is done in polynomial time according to various embodiments. This allows for comparisons of biometrics and achieve values for comparison that indicate "closeness" of two biometrics to one another in the encrypted space (e.g. a biometric to a reference biometric) while at the same time providing for the highest level of privacy.

Various examples detail implementation of one-to-many identification using, for example, the N-1 layer of a deep neural network. The various techniques are biometric agnostic, allowing the same approach irrespective of the biometric or the biometric type. Each biometric (face, voice, IRIS, etc.) can be processed with a different, fully trained, neural network to create the biometric feature vector.

According to some aspects, an issue with current biometric schemes is they require a mechanism for: (1) acquiring the biometric, (2) plaintext biometric match, (3) encrypting the biometric, (4) performing a Euclidean measurable match, and (5) searching using the second neural network prediction call. To execute steps 1 through 5 for every biometric is time consuming, error prone and frequently nearly impossible to do before the biometric becomes deprecated. One goal with various embodiments, is to develop a scheme, techniques and technologies that allow the system to work with biometrics in a privacy protected and polynomial-time based way that is also biometric agnostic. Various embodiments employ machine learning to solve problems issues with (2)-(5).

According to various embodiments, assumed is or no control over devices such as cameras or sensors that acquire the to be analyzed biometrics (thus arriving as plain text). According to various embodiments, if that data is encrypted immediately and only process the biometric information as cipher text, the system provides the maximum practical level of privacy. According to another aspect, a one-way encryption of the biometric, meaning that given cipher text, there is no mechanism to get to the original plaintext, reduces/eliminates the complexity of key management of various conventional approaches. Many one-way encryption algorithms exist, such as MD5 and SHA-512 -however, these algorithms are not homomorphic because they are not Euclidean measurable. Various embodiments discussed herein enable a general purpose solution that produces biometric cipher text that is Euclidean measurable using a neural network. Apply a classifying algorithm to the resulting feature vectors enables one-to-many identification. In various examples, this maximizes privacy and runs between $O(n)=1$ and $O(n)=\log(n)$ time.

As discussed above, some capture devices can encrypt the biometric via a one way encryption and provide feature vectors directly to the system. This enables some embodiments, to forgo biometric processing components, training generation components, and feature vector generation components, or alternatively to not use these elements for already encrypted feature vectors.

Example Execution and Accuracy

In some executions, the system is evaluated on different numbers of images per person to establish ranges of operating parameters and thresholds. For example, in the experimental execution the num-epochs establishes the number of interactions which can be varied on the system (e.g., between embodiments, between examples, and between executions, among other options). The LFW dataset is taken from the known labeled faces in the wild data set. Eleven people is a custom set of images and faces 94 from the known source—faces 94. For our examples, the epochs are the number of new images that are morphed from the original images. So if the epochs are 25, and we have 10 enrollment images, then we train with 250 images. The morphing of the images changed the lighting, angels and the like to increase the accuracy in training.

TABLE I (fully connected neural network model with 2 hidden layers + output sigmoid layer):
➢ Input => [100, 50] => num_people (train for 100 people given 50 individuals to identify). Other embodiments improve over these accuracies for the UNKNOWN.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.90% | 86.40% |
| LFW | 70% | 30% | 11 people dataset | 2226 | 257 | min_images_per_person = 3 num-epochs = 25 | 93.90% | 87.20% |
| 11 people | 70% | 30% | Copy 2 people from LFW | 77 | 4 | min_images_per_person = 2 num-epochs = 25 | 100.00% | 50.00% |
| faces94 | 70% | 30% | 11 people dataset | 918 | 257 | min_images_per_person = 2 num-epochs = 25 | 99.10% | 79.40% |

TABLE II (0 hidden layers & output linear with decision f(x); Decision at .5 value)
Improves accuracy for the UNKNOWN case, but other implementations achieve higher accuracy.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.80% | 91.10% |
| LFW | 70% | 30% | 11 people dataset | 2226 | 257 | min_images_per_person = 3 num-epochs = 25 | 96.60% | 97.70% % |
| 11 people | 70% | 30% | Copy 2 people from LFW | 77 | 4 | min_images_per_person = 2 num-epochs = 25 | 98.70% | 50.00% |
| faces94 | 70% | 30% | 11 people dataset | 918 | 257 | min_images_per_person = 2 num-epochs = 25 Cut-off = 0.5 | 99.10% | 82.10% |
| faces94 | 70% | 30% | 11 people dataset | 918 | 257 | min_images_per_person = 2 num-epochs = 25 Cut-off = 1.0 | 98.30% | 95.70% |

TABLE III

FCNN with 1 hidden layer (500 nodes) + output linear with decision

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 99.30% | 92.20% |
| LFW | 70% | 30% | 11 people dataset | 2226 | 257 | min_images_per_person = 3 num-epochs = 25 | 97.50% | 97.70% |
| 11 people | 70% | 30% | Copy 2 people from LFW | 77 | 4 | min_images_per_person = 2 num-epochs = 25 | | |
| faces94 | 70% | 30% | 11 people dataset | 918 | 257 | min_images_per_person = 2 num-epochs = 25 Cut-off = 0.5 | 99.20% | 92.60% |
| faces94 | 70% | 30% | 11 people dataset | 918 | 257 | min_images_per_person = 2 num-epochs = 25 Cut-off = 1.0 | | |

TABLE IV

FCNN 2 Hidden Layers (500, 2*num_people) + output linear, decisions f(x)

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.30% | 97.70% |
| LFW | 70% | 30% | 11 people dataset | 2226 | 257 | min_images_per_person = 3 num-epochs = 25 Cut-off = 0 | 98.50% | 98.10% |
| 11 people | 70% | 30% | Copy 2 people from LFW | 77 | 4 | min_images_per_person = 2 num-epochs = 25 | | |
| faces94 | 70% | 30% | 11 people dataset | 918 | 257 | min_images_per_person = 2 num-epochs = 25 Cut-off = 0 | 98.60% | 93.80% |

In various embodiments, the neural network model is generated initially to accommodate incremental additions of new individuals to identify (e.g., 2*num_people is an example of a model initially trained for 100 people given an initial 50 individuals of biometric information). The multiple or training room provides can be tailored to the specific implementation. For example, where additions to the identifiable users is anticipated to be small additional incremental training options can include any number with ranges of 1% to 200%. In other embodiments, larger percentages can be implemented as well.

TABLE V

FCNN: 2 Hidden Layers (500, 2*num_people) + output linear, decisions f(x), and voting-where the model is trained on 2* the number of class identifiers for incremental training.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set = 11 people | Accuracy In UNKNOWN PERSON Set = faces94 |
|---|---|---|---|---|---|---|---|---|---|
| LFW | 70% | 30% | 11 people dataset | 1304 | 257 | min_images_per_person = 10 num-epochs = 25 | 98.20% (vote) 100.00% | 98.80% (vote) 100.00% | 88.40% (vote) 90.80% |
| LFW | 70% | 30% | 11 people dataset | 2226 | 257 | min_images_per_person = 3 num-epochs = 25 Cut-off = 0 | 98.10% (vote) 98.60% | 98.40% (vote) 100.00% | 93.60% (vote) 95.40% |
| 11 people | 70% | 30% | Copy 2 people from LFW | 77 | 4 | min_images_per_person = 2 num-epochs = 25 | | | |
| faces94 | 70% | 30% | 11 people dataset | 918 | 257 | min_images_per_person = 2 num-epochs = 25 Cut-off = 0 | | | |

According to one embodiment the system can be implemented as a REST compliant API that can be integrates and/or called by various programs, applications, systems, system components, etc., and can be requested locally or remotely.

In one example, the privacy-enabled biometric API includes the following specifications:

Preparing data: this function takes the images & labels and save them into the local directory.

```
{
    def add_training_data(list_of_images, list_of_label) :
        @params list_of_images: the list of images
        @params list_of_label: the list of corresponding labels
}
```

Training model: each label (person/individual) should have at least 2 images. In some examples, if the person does not have the minimum that person will be ignored.

```
{
    def train( ) :
}
```

Prediction:

```
{
    def predict(list_of_images) :
        @params list_of_images: the list of images of the same person
        @return label: a person name or "UNKNOWN_PERSON"
}
```

Furthers embodiments can be configured to handle new people (e.g., labels or classes I the model) in multiple way. In one example, the current model can be retrain every time (e.g., with a threshold number) a certain number of new people are introduced. In this example, the benefit is improved accuracy—the system can guarantee a level of accuracy even with new people. There exists a trade-off in that full retraining is a slow time consuming and heavy computation process. This can be mitigated with live and offline copies of the model so the retraining occurs offline and the newly retrain model is swapped for the live version.

In one example, training time executed in over 20 minutes. With more data the training time increases.

According to another example, the model is initialized with slots for new people. The expanded model is configured to support incremental training (e.g., the network structure is not changed when adding new people). In this example, the time add new people is significantly reduces (even over other embodiments of the privacy-enabled biometric system). It is realized that there may be some reduction in accuracy with incremental training, and as more and more people are added the model can trends towards overfit on the new people i.e., become less accurate with old people. However, various implementation have been tested to operate at the same accuracy even under incremental retraining.

Yet another embodiments implements both incremental retraining and full retraining at a threshold level (e.g., build the initial model with a multiple of the people as needed— (e.g., 2 times –100 labels for an initial 50 people, 50 labels for an initial 25 people, etc.)). Once the number of people reaches the upper bound (or approaches the upper bound) the system can be configured to execute a full retrain on the model, while building in the additional slots for new users.

In one example, given 100 labels in the model with 50 initial people (50 unallocated) reaches 50 new people, the system will execute a full retrain for 150 labels and now 100 actual people. This provides for 50 additional users and incremental retraining before a full retrain is executed.

Stated generally, the system in various embodiments is configured to retrain the whole network from beginning for every N people step. Training data: have 100 people; step 1: train the network with N=1000 people; assign 100 people and reserving 900 to train incremental; train incrementally with new people until we reach 1000 people; and reach 1000 people, full retrain. Full retrain: train the network with 2N=2000 people; now have 1000 people for reserving to train incremental; train incrementally with new people until we reach 2000 people; and repeat the full retrain with open allocations when reach the limit.

An example implementation of the API includes the following code:

```
drop database if exists trueid;
create database trueid;
grant all on trueid.* to trueid@'localhost' identified by 'trueid';
drop table if exists feature;
drop table if exists image;
drop table if exists PII;
drop table if exists subject;
CREATE TABLE subject
(
    id INT PRIMARY KEY AUTO_INCREMENT,
    when_created TIMESTAMP DEFAULT CURRENT_TIMESTAMP
);
CREATE TABLE PII
(
    id INT PRIMARY KEY AUTO_INCREMENT,
    subject_id INT,
    tag VARCHAR(254),
    value VARCHAR(254)
);
CREATE TABLE image
(
    id INT PRIMARY KEY AUTO_INCREMENT,
    subject_id INT,
    image_name VARCHAR(254),
    is_train boolean,
    when_created TIMESTAMP DEFAULT CURRENT_TIMESTAMP
);
CREATE TABLE feature
(
    id INT PRIMARY KEY AUTO_INCREMENT,
    image_id INT NOT NULL,
    feature_order INT NOT NULL,
    feature_value DECIMAL(32,24) NOT NULL
);
```

ALTER TABLE image ADD CONSTRAINT fk_subject_id FOREIGN KEY (subject_id) REFERENCES subject (id);
ALTER TABLE PII ADD CONSTRAINT fk_subject_id_pii FOREIGN KEY (subject_id) REFERENCES subject (id);
ALTER TABLE feature ADD CONSTRAINT fk_image_id FOREIGN KEY (image_id) REFERENCES image (id);
CREATE INDEX piisubjectid ON PII(subject_id);
CREATE INDEX imagesubjectid ON image(subject_id);
CREATE INDEX imagesubjectidimage ON image(subject_id, image_name);
CREATE INDEX featureimage_id ON feature(image_id);

API Execution Example:
Push the known LFW feature embeddings to biometric feature database.

Simulate the incremental training process:
num_seed=50 # build the model network, and first num_seed people was trained fully
num_window=50# For every num_window people: build the model network, and people trained fully
num_step=1# train incremental every new num_step people
num_eval=10# evaluate the model every num_eval people
Build the model network with #class=100. Train from beginning (#epochs=100) with the first 50 people. The remaining 50 classes are reserved for incremental training.
  i) Incremental training for the 51st person. Train the previous model with all 51 people (#epochs=20)
  ii) Incremental training for the 52st person. Train the previous model with all 52 people (#epochs=20)
  iii) continue . . .
(Self or automatic monitoring can be executed by various embodiments to ensure accuracy over time—alert flags can be produced if deviation or excessive inaccuracy is detected; alternatively or in conjunction full retraining can be executed responsive to excess inaccuracy and the fully retrained model evaluated to determine is accuracy issues are resolved—if so the full retrain threshold can be automatically adjusted). Evaluate the accuracy of the previous model (e.g., at every 10 steps), optionally record the training time for every step.
Achieve incremental training for maximum allocation (e.g., the 100th person). Full train of the previous model with all 100 people (e.g., #epochs=20)
Build the model network with #class=150. Train from beginning (e.g., #epochs=100) with the first 100 people. The remaining 50 classes are reserved for incremental training.
  i) Incremental training for the 101st person. Train the previous model with all 101 people (#epochs=20)
  ii) continue . . .
Build the model network with #class=200. Train from beginning (e.g., #epochs=100) with the first 150 people. The remaining 50 classes are reserved for incremental training.
  i) Incremental training for the 151st person. Train the previous model with all 151 people (#epochs=20)
  ii) Continue . . .
Refactor problem:

According to various embodiments, it is realized that incremental training can trigger concurrency problems: e.g., a multi-thread problem with the same model, thus the system can be configured to avoid retrain incrementally at the same time for two different people (data can be lost if retraining occurs concurrently). In one example, the system implements a lock or a semaphore to resolve. In another example, multiple models can be running simultaneously—and reconciliation can be executed between the models in stages. In further examples, the system can monitoring models to ensure only one retrain is executed one multiple live models, and in yet others use locks on the models to ensure singular updates via incremental retrain. Reconciliation can be executed after an update between models. In further examples, the system can cache feature vectors for subsequent access in the reconciliation.

According to some embodiments, the system design resolves a data pipeline problem: in some examples, the data pipeline supports running one time due to queue and thread characteristics. Other embodiments, avoid this issue by extracting the embeddings. In examples, that do not include that functionality the system can still run multiple times without based on saving the embedding to file, and loading the embedding from file. This approach can be used where the extracted embedding is unavailable via other approaches. Various embodiments can employ different options for operating with embeddings: when we give a value to a tensorflow, we have several ways: Feed_dict (speed trade-off for easier access); and Queue: faster via multi-threads, but can only run one time (the queue will be end after it's looped).

Table VIII & TABLE IX (below) shows execution timing during operation and accuracy percentages for the example.

TABLE VI

| 1 | STEP | ACTION | INFO | TIME | ACCURACY |
|---|---|---|---|---|---|
| 2 | 50 | Retrieving feature embedding | | 100.939024 | |
| 3 | 50 | Training Deep Learning classifier | | 54.34578061 | |
| 4 | 51 | Retrieving feature embedding | | 104.8042319 | |
| 5 | 51 | Training incrementally Deep Learning classifier | | 9.755134106 | |
| 6 | 52 | Retrieving feature embedding | | 105.692045 | |
| 7 | 52 | Training incrementally Deep Learning classifier | | 9.367767096 | |
| 8 | 53 | Retrieving feature embedding | | 95.68940234 | |
| 9 | 53 | Training incrementally Deep Learning classifier | | 9.38846755 | |
| 10 | 54 | Retrieving feature embedding | | 108.8445647 | |
| 11 | 54 | Training incrementally Deep Learning classifier | | 9.668224573 | |
| 12 | 55 | Retrieving feature embedding | | 108.7391896 | |
| 13 | 55 | Training incrementally Deep Learning classifier | | 10.2577827 | |
| 14 | 56 | Retrieving feature embedding | | 107.1305535 | |
| 15 | 56 | Training incrementally Deep Learning classifier | | 9.660038471 | |
| 16 | 57 | Retrieving feature embedding | | 111.1128619 | |
| 17 | 57 | Training incrementally Deep Learning classifier | | 9.824867487 | |
| 18 | 58 | Retrieving feature embedding | | 109.780278 | |
| 19 | 58 | Training incrementally Deep Learning classifier | | 10.25701618 | |
| 20 | 59 | Retrieving feature embedding | | 114.9919829 | |
| 21 | 59 | Training incrementally Deep Learning classifier | | 9.752382278 | |
| 22 | 60 | Retrieving feature embedding | | 114.3731036 | |
| 23 | 60 | Training incrementally Deep Learning classifier | | 10.15184236 | |
| 24 | 60 | Accuracy | #test_images = 533 | | 0.988743 |
| 25 | 60 | Vote Accuracy | #test_images = 533 | | 1 |
| 26 | 61 | Retrieving feature embedding | | 118.237993 | |
| 27 | 61 | Training incrementally Deep Learning classifier | | 10.0895071 | |
| 28 | 62 | Retrieving feature embedding | | 120.2519257 | |
| 29 | 62 | Training incrementally Deep Learning classifier | | 10.69825125 | |

TABLE VI-continued

| 1 | STEP | ACTION | INFO | TIME | ACCURACY |
|---|---|---|---|---|---|
| 30 | 63 | Retrieving feature embedding | | 119.3803787 | |
| 31 | 63 | Training incrementally Deep Learning classifier | | 10.66580486 | |
| 32 | 64 | Retrieving feature embedding | | 138.031605 | |
| 33 | 64 | Training incrementally Deep Learning classifier | | 12.32183456 | |
| 34 | 65 | Retrieving feature embedding | | 133.2701755 | |
| 35 | 65 | Training incrementally Deep Learning classifier | | 12.35964537 | |
| 36 | 66 | Retrieving feature embedding | | 136.8798289 | |
| 37 | 66 | Training incrementally Deep Learning classifier | | 12.07544327 | |
| 38 | 67 | Retrieving feature embedding | | 140.3868775 | |
| 39 | 67 | Training incrementally Deep Learning classifier | | 12.54206896 | |
| 40 | 68 | Retrieving feature embedding | | 140.855052 | |
| 41 | 68 | Training incrementally Deep Learning classifier | | 12.59552693 | |
| 42 | 69 | Retrieving feature embedding | | 140.2500689 | |
| 43 | 69 | Training incrementally Deep Learning classifier | | 12.55604577 | |
| 44 | 70 | Retrieving feature embedding | | 144.5612676 | |
| 45 | 70 | Training incrementally Deep Learning classifier | | 12.95398426 | |
| 46 | 70 | Accuracy | #test_images = 673 | | 0.9925706 |
| 47 | 70 | Vote Accuracy | #test_images = 673 | | 1 |
| 48 | 71 | Retrieving feature embedding | | 145.2458987 | |
| 49 | 71 | Training incrementally Deep Learning classifier | | 13.09419131 | |

TABLE VII

| 1 | STEP | ACTION | INFO | TIME | ACCURACY |
|---|---|---|---|---|---|
| 67 | 80 | Training incrementally Deep Learning classifier | | 14.24880123 | |
| 68 | 80 | Accuracy | #test_images = 724 | | 0.9903315 |
| 69 | 80 | Vote Accuracy | #test_images = 724 | | 1 |
| 70 | 81 | Retrieving feature embedding | | 153.8295755 | |
| 71 | 81 | Training incrementally Deep Learning classifier | | 14.72389603 | |
| 72 | 82 | Retrieving feature embedding | | 157.9210677 | |
| 73 | 82 | Training incrementally Deep Learning classifier | | 14.57672453 | |
| 74 | 83 | Retrieving feature embedding | | 164.8383744 | |
| 75 | 83 | Training incrementally Deep Learning classifier | | 21.83570766 | |
| 76 | 84 | Retrieving feature embedding | | 161.2950387 | |
| 77 | 84 | Training incrementally Deep Learning classifier | | 14.25801277 | |
| 78 | 85 | Retrieving feature embedding | | 155.9785285 | |
| 79 | 85 | Training incrementally Deep Learning classifier | | 14.45170879 | |
| 80 | 86 | Retrieving feature embedding | | 160.9079704 | |
| 81 | 86 | Training incrementally Deep Learning classifier | | 14.81818509 | |
| 82 | 87 | Retrieving feature embedding | | 164.5734673 | |
| 83 | 87 | Training incrementally Deep Learning classifier | | 18.26664591 | |
| 84 | 88 | Retrieving feature embedding | | 169.8400548 | |
| 85 | 88 | Training incrementally Deep Learning classifier | | 15.75074983 | |
| 86 | 89 | Retrieving feature embedding | | 169.2413263 | |
| 87 | 89 | Training incrementally Deep Learning classifier | | 15.93148685 | |
| 88 | 90 | Retrieving feature embedding | | 172.5191889 | |
| 89 | 90 | Training incrementally Deep Learning classifier | | 15.88449383 | |
| 90 | 90 | Accuracy | #test_images = 822 | | 0.986618 |
| 91 | 90 | Vote Accuracy | #test_images = 822 | | 0.9963504 |
| 92 | 91 | Retrieving feature embedding | | 170.162873 | |
| 93 | 91 | Training incrementally Deep Learning classifier | | 15.72525668 | |
| 94 | 92 | Retrieving feature embedding | | 174.9947026 | |
| 95 | 92 | Training incrementally Deep Learning classifier | | 15.791049 | |
| 96 | 93 | Retrieving feature embedding | | 175.3449857 | |
| 97 | 93 | Training incrementally Deep Learning classifier | | 15.8756597 | |
| 98 | 94 | Retrieving feature embedding | | 177.0825081 | |
| 99 | 94 | Training incrementally Deep Learning classifier | | 15.72812366 | |
| 100 | 95 | Retrieving feature embedding | | 178.8846812 | |
| 101 | 95 | Training incrementally Deep Learning classifier | | 16.04615927 | |
| 102 | 96 | Retrieving feature embedding | | 171.2114341 | |
| 103 | 96 | Training incrementally Deep Learning classifier | | 16.32442522 | |
| 104 | 97 | Retrieving feature embedding | | 177.8708515 | |
| 105 | 97 | Training incrementally Deep Learning classifier | | 15.90093112 | |
| 106 | 98 | Retrieving feature embedding | | 177.5916936 | |
| 107 | 98 | Training incrementally Deep Learning classifier | | 16.57834721 | |
| 108 | 99 | Retrieving feature embedding | | 185.1854212 | |
| 109 | 99 | Training incrementally Deep Learning classifier | | 16.64935994 | |
| 110 | 100 | Retrieving feature embedding | | 179.5375969 | |
| 111 | 100 | Training incrementally Deep Learning classifier | | 17.24395561 | |
| 112 | 100 | Accuracy | #test_images = 875 | | 0.9897143 |
| 113 | 100 | Vote Accuracy | #test_images = 875 | | 1 |
| 114 | 100 | Retrieving feature embedding | | 184.8017459 | |

TABLE VIII shows summary information for additional executions.

| Dataset | Training Set | Test Set | UNKNOWN PERSON Set | #people In Training Set | #images In Test Set | #images In UNKNOWN PERSON Set | Parameters | Accuracy In Test Set |
|---|---|---|---|---|---|---|---|---|
| LFW | 70% | 30% | 11 people dataset | 158 | 1304 | 257 | min_images_per_person = 10 num-epochs = 25 Cut-off = 0 | 98.70% (vote) 100.00% |
| LFW | 70% | 30% | 11 people dataset | 901 | 2226 | 257 | min_images_per_person = 3 num-epochs = 25 Cut-off = 0 | 93.80% (vote) 95.42% |

According to one embodiment, the system can be described broadly to include the any one or more or any combination of the following elements and associated functions:

Preprocessing: where the system takes in an unprocessed biometric, which can include cropping and aligning and either continues processing or returns that the biometric cannot be processed.

Neural network 1: Pre-trained. Takes in unencrypted biometrics. Returns biometric feature vectors that are one way encrypted and Euclidean measureable. Regardless of biometric type being processed—NN1 generates Euclidean measurable encrypted feature vectors.

Neural network 2: Not pre-trained. It is a deep learning neural network that does classification. Includes incremental training, takes a set of label, feature vector pairs as input and returns nothing during training—the trained network is used for matching or prediction on newly input biometric information. Does prediction, which takes a feature vector as input and returns an array of values. These values, based on their position and the value itself, determine the label or unknown.

Voting functions can be executed with neural network 2 e.g., during prediction.

System may have more than one neural network 1 for different biometrics. Each would generate Euclidean measurable encrypted feature vectors based on unencrypted input.

System may have multiple neural network 2(s) one for each biometric type.

Modifications and variations of the discussed embodiments will be apparent to those of ordinary skill in the art and all such modifications and variations are included within the scope of the appended claims. An illustrative implementation of a computer system 800 that may be used in connection with any of the embodiments of the disclosure provided herein is shown in FIG. 8. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIGS. 1 and 2A-2B, 9, 10, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. An authentication system for evaluating privacy-enabled biometrics and validating contemporaneous input of biometrics, the system comprising:
   at least one processor operatively connected to a memory;
   an interface, executed by the at least one processor configured to:
      receive a candidate set of instances of a first biometric data type input by a user requesting authentication;
   a classification component executed by the at least one processor, configured to:
      analyze a liveness threshold, wherein analyzing the liveness threshold includes processing the candidate set of instances to determine that the candidate set of instances matches a random set of instances;
   the classification component further comprising at least a first deep neural network ("DNN"), the classification component configured to:
      accept, as an input to the first DNN, one-way homomorphic encrypted feature vectors, output from at least one layer of a first neural network, the first neural network configured to process a plaintext input of the first biometric data type into the one-way homomorphic encrypted feature vectors;
      classify, with the first DNN during training, the one-way homomorphic encrypted feature vectors of the first biometric data type, based on training the first DNN with the one-way homomorphic encrypted feature vectors and respective labels taken as inputs;
      define at least a plurality of identification classes during training of the first DNN, wherein respective identification classes correspond to the respective labels, and the respective labels are associated with respective user identities;
      return, during prediction, a matching label for person identification from the plurality of identification classes in response to a match and an unknown result responsive to failure to match to the plurality of identification classes based, at least in part, on analyzing one-way homomorphic encrypted feature vectors with the first DNN; and
      confirm the matching label based at least on the liveness threshold.

2. The system of claim 1, wherein the classification component is configured to:
   determine for values above the liveness threshold that the contemporaneous input matches the random set of instances; and
   determine for values below the liveness threshold that a current authentication request is invalid.

3. The system of claim 1, further comprising a liveness component, executed by the at least one processor, configured to generate a random set of instances of a first biometric data type in response to an authentication request.

4. The system of claim 3, wherein the system is configured to request a user provide the candidate set of instances of the first biometric data type based on the generated random set of instances.

5. The system of claim 4, wherein the interface is configured to prompt user input of randomly selected instances of the first biometric data type, that are requested as input to establish a threshold volume of biometric information confirmed at validation.

6. The system of claim 1, wherein the classification component further comprises at least a first pair of neural networks configured to process the first biometric data type, the pair including the first DNN and the first neural network, wherein the first neural network is configured to:
   generate a first training encrypted feature vector output that is coupled with a respective label to train the first DNN, and
   generate a first prediction encrypted feature vector output for prediction using the first DNN on input of a new biometric of the first biometric data type; and
   wherein the classification component further comprises:
   an application running on a user device configured to:
      execute the first neural network on the user device to capture and process plaintext input of the first biometric data type;
      communicate the first prediction encrypted feature vector output of the first neural network to a remote application executing the first DNN; and
      delete from memory the plaintext input of the first biometric data type;

a remote application running on a server system configured to:
  execute the first DNN to classify the first prediction encrypted feature vector output of the first biometric type to determine if there is a match to an existing label; and
at least a second pair of neural networks including a second deep neural network ("DNN") and a second neural network to process a second biometric data type, wherein the second neural network is configured to:
  generate a second training encrypted feature vector output, from a plaintext input of the second biometric data type, that is coupled with a respective label to train the second DNN, and
  generate a second prediction encrypted feature vector output for prediction using the second DNN on input of a new biometric of the second biometric data type; and
wherein the application running on the user device is further configured to:
  execute the second neural network on the user device to capture and process plaintext input of the second biometric data type;
  communicate the second prediction encrypted feature vector output of the second neural network to the server system executing the second DNN; and
  delete from memory the plaintext input of the second biometric data type; and
wherein the second deep neural network ("DNN") is configured to:
  accept the second prediction encrypted feature vector output generated from the second neural network and classify the second prediction encrypted feature vector output from the second neural network;
wherein the remote application running on the server system is further configured to:
  execute the second DNN to determine if there is a match to an existing label; and
  return a label for person identification or an unknown result during prediction responsive to analyzing the second prediction encrypted feature vector output of the second neural network; and
wherein the classification component is configured to confirm identification based on matching respective labels for person identification from the first and second DNNs.

7. The system of claim 1, wherein the classification component further comprises:
at least a first pair of neural networks configured to process the first biometric data type, the pair including the first DNN and the first neural network;
at least a second pair of neural networks, including a second DNN and a second neural network, configured to process a second biometric data type;
an application running on a user device configured to:
  execute the first neural network and the second neural network to generate respective first and second encrypted feature vectors responsive to plaintext biometric input;
  communicate the respective first and second encrypted feature vectors to a remote application; and
  delete plaintext biometric input from memory responsive to generation of the respective first and second encrypted feature vectors; and
a remote application running on a server system configured to:
  execute the first and the second DNN to classify the respective first and second encrypted feature vectors; and
  return a valid authentication signal to the application running on the user device responsive to matching the respective first and second encrypted feature vectors of the first and second biometric data type to a label.

8. The system of claim 1, further comprising the first neural network configured to process an unencrypted a plaintext input of the first biometric data type into the one-way homomorphic encrypted feature vectors of the first biometric data type.

9. The system of claim 8, further comprising a pre-processing component configured to reduce a volume of plaintext input biometric information for input into the first neural network.

10. The system of claim 1, wherein the classification component is configured to incrementally update the first DNN with new person labels and new person feature vectors, based on updating null or undefined elements defined in the first DNN at training, and maintaining a network architecture of the first DNN, and accommodating the unknown result for subsequent predictions without requiring full retraining of the first DNN.

11. The system of claim 1, wherein the system is configured to analyze output values from the first DNN and based on positioning of the output values in an array and values in positions in the array, determine the label or unknown.

12. A computer implemented method of evaluating privacy-enabled biometrics and validating contemporaneous input of biometrics, the method comprising:
receiving, by at least one processor, a candidate set of instances of a first biometric data type input by a user requesting authentication;
analyzing, by the at least on processor, a liveness threshold, wherein analyzing the liveness threshold includes processing the candidate set of instances to determine that the candidate set of instances matches a random set of instances;
accepting, by a first deep neural network ("DNN") executed by the at least one processor, one-way homomorphic encrypted feature vectors output from at least one layer of a first neural network, the first neural network configured to process a plaintext input of the first biometric data type into the one-way homomorphic encrypted feature vectors;
classifying, by the first DNN during training, the one-way homomorphic encrypted feature vectors of the first biometric data type, based on training the first DNN with the one-way homomorphic encrypted feature vectors and respective labels taken as inputs;
defining at least a plurality of identification classes during training of the first DNN, wherein respective identification classes correspond to the respective labels, and the respective labels are associated with respective user identities;
returning, by the first DNN during prediction, a matching label for person identification from the plurality of identification classes in response to a match and an unknown result responsive to failure to match to the plurality of identification classes based, at least in part, on analyzing one-way homomorphic encrypted feature vectors; and
confirming the matching label based at least on the liveness threshold.

13. The method of claim 12, wherein the method further comprises:
  determining for values above the liveness threshold that the contemporaneous input matches the random set of instances; and
  determining for values below a threshold that a current authentication request is invalid.

14. The method of claim 12, wherein the method further comprises generating a random set of instances of a first biometric data type in response to an authentication request.

15. The method of claim 14, wherein the method further comprises requesting a user provide the candidate set of instances of the first biometric data type based on the generated random set of instances.

16. The method of claim 15, wherein the method further comprises prompting user input of randomly selected instances of the first biometric data type, that are requested as input to establish a threshold volume of biometric information confirmed at validation.

17. The method of claim 12, wherein the method further comprises:
  accepting, by at least a second deep neural network, second encrypted feature vectors generated from a second neural network, the second neural network configured to process a plaintext input of a second biometric data type into the second encrypted feature vectors of the second biometric data type;
  returning, by the second DNN a label for person identification or an unknown result during prediction responsive to analyzing the second encrypted feature vectors of the second biometric data type; and
  confirming identification based on matching respective labels for person identification from the first and second DNNs;
  executing an application on a user device, wherein executing includes managing operation of the first neural network and second neural network to generate respective first and second encrypted feature vectors of the first and the second biometric data types;
  communicating, by the application, the first and second encrypted feature vectors of the first and the second biometric data types to a remote application;
  deleting from memory plaintext input of the first and the second biometric data type, responsive to generating respective first and second encrypted feature vectors;
  managing, by the remote application running on a server system, the first and second DNN to classify the respective first and second encrypted feature vectors; and
  returning, by the remote application, a valid authentication signal to the application responsive to matching the respective first and second encrypted feature vectors of the first and second biometric data type to respective labels.

18. The method of claim 12, wherein the method further comprises processing, by the first neural network, a plaintext input of the first biometric data type into the one-way homomorphic encrypted feature vectors of the first biometric data type.

19. The method of claim 12, wherein the method further comprises incrementally updating the first DNN with new person labels and new persons feature vectors, based on updating null or undefined elements established in the first DNN at training, and maintaining an architecture of the first DNN and accommodating the unknown result for subsequent predictions without requiring full retraining of the first DNN.

* * * * *